US012615337B2

(12) United States Patent　　(10) Patent No.: US 12,615,337 B2

Kurita　　(45) Date of Patent: Apr. 28, 2026

(54) IMAGE FORMING APPARATUS WITH A WIRELESS TAG COMMUNICATION DEVICE THAT RADIATES A RADIO WAVE TO TWO AREAS

(71) Applicant: Toshiba Tec Kabushiki Kaisha, Tokyo (JP)

(72) Inventor: Eizo Kurita, Sunto (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/410,889

(22) Filed: Jan. 11, 2024

(65) Prior Publication Data

US 2024/0430370 A1　Dec. 26, 2024

(30) Foreign Application Priority Data

Jun. 20, 2023　(JP) ................................. 2023-100749

(51) Int. Cl.
　　*H04N 1/00*　　　(2006.01)
　　*G06K 7/10*　　　(2006.01)
(52) U.S. Cl.
　　CPC ..... *H04N 1/00342* (2013.01); *G06K 7/10099* (2013.01); *H04N 1/0057* (2013.01)
(58) Field of Classification Search
　　CPC ........... H04N 3/00342; G06K 7/10099; G06K 17/0029
　　See application file for complete search history.

(56) References Cited

U.S. PATENT DOCUMENTS 10,255,535 B1 *　4/2019　Takada ................ G06K 17/0025
2002/0167397 A1 *　11/2002　Eroglu ................. G06K 7/0008
　　　　　　　　　　　　　　　　340/10.6

2006/0061814 A1 *　3/2006　Tokunaga .......... H04N 1/00342
　　　　　　　　　　　　　　　　358/1.15
2021/0289083 A1 *　9/2021　Takada ............... H04N 1/00342
2022/0197733 A1　6/2022　Tomiyama et al.

FOREIGN PATENT DOCUMENTS

| JP | 2005-343103 A | 12/2005 |
|---|---|---|
| JP | 2006-035798 A | 2/2006 |
| JP | 2006-212950 A | 8/2006 |
| JP | 2007-076066 A | 3/2007 |
| JP | 2008-033524 A | 2/2008 |

OTHER PUBLICATIONS

Notice of Reasons for Refusal mailed Mar. 3, 2026 in corresponding Japanese Patent Application No. 2023-100749, 18 pages (with Translation).

* cited by examiner

*Primary Examiner* — Peter K Huntsinger

(74) *Attorney, Agent, or Firm* — Kim & Stewart LLP

(57) ABSTRACT

An image forming apparatus includes a sheet feeder on which a medium with a wireless tag is placeable, a conveyance mechanism, an image forming unit, a wireless tag communication device to communicate with the tag by radiating a radio wave to: a first area on a conveyance path of the medium and downstream of the feeder and a second area on the feeder, and a processor to: control the mechanism to convey a medium and control the communication device to radiate a radio wave to the first area to write data into a wireless tag attached to the medium. The processor is configured to, in response to an operation for reading data from a wireless tag attached to a medium on the sheet feeder, control the communication device to radiate a radio wave to the second area to read the data.

23 Claims, 12 Drawing Sheets

RADIATION DIRECTION

RECEIVED RADIO
WAVE INTENSITY
(VALUE BY APP)

| | |
|---|---|
| | 50~ |
| | 40-49 |
| | 30-39 |

IMAGE FORMING APPARATUS WITH A WIRELESS TAG COMMUNICATION DEVICE THAT RADIATES A RADIO WAVE TO TWO AREAS

CROSS-REFERENCE TO RELATED APPLICATION

This application is based upon and claims the benefit of priority from Japanese Patent Application No. 2023-100749, filed Jun. 20, 2023, the entire contents of which are incorporated herein by reference.

FIELD

Embodiments described herein relate generally to an image forming apparatus, a method, and a storage medium.

BACKGROUND

A conventional image forming apparatus writes tag information to a radio frequency identification (RFID) tag after a printing medium is conveyed to a position where the tag information is written to the RFID tag. Then, the image forming apparatus performs a verification process to determine whether the tag information has been properly written to the RFID tag, and forms an image on the printing medium after the tag information is written to the RFID tag. Here, a reading device for reading tag information from an RFID tag has been used by a user to confirm whether desired tag information has been written to the RFID tag after the writing of the tag information. For example, using such a reading device makes it necessary for the user to operate the reading device in addition to the image forming apparatus, and makes it necessary for the user to learn how to operate the reading apparatus and make preparations for using the reading apparatus.

SUMMARY OF THE INVENTION

An aspect of this disclosure provides an image forming apparatus, a method, and a storage medium that can reduce the time and effort required for a user to confirm tag information written to a wireless tag.

According to an aspect of this disclosure, an image forming apparatus, comprises a sheet feeder on which a printing medium is placeable, a wireless tag being attached to the printing medium; a conveyance mechanism configured to convey the printing medium; an image forming unit configured to form an image on the printing medium; a wireless tag communication device configured to communicate with the wireless tag by radiating, via an antenna, a radio wave to each of: a first area that is on a conveyance path along which the printing medium is conveyed by the conveyance mechanism and located downstream of the sheet feeder and a second area that is in an area where the printing medium is placed on the sheet feeder; and a processor configured to: control the conveyance mechanism to convey a printing medium and control the wireless tag communication device to radiate a radio wave to the first area to write data into a wireless tag attached to the printing medium, and control the image forming unit to form an image on the printing medium. The processor is configured to, in response to an operation for reading data from a wireless tag attached to a printing medium placed on the sheet feeder, control the wireless tag communication device to radiate a radio wave to the second area to read the data from the wireless tag.

DETAILED DESCRIPTION

Figure 1:
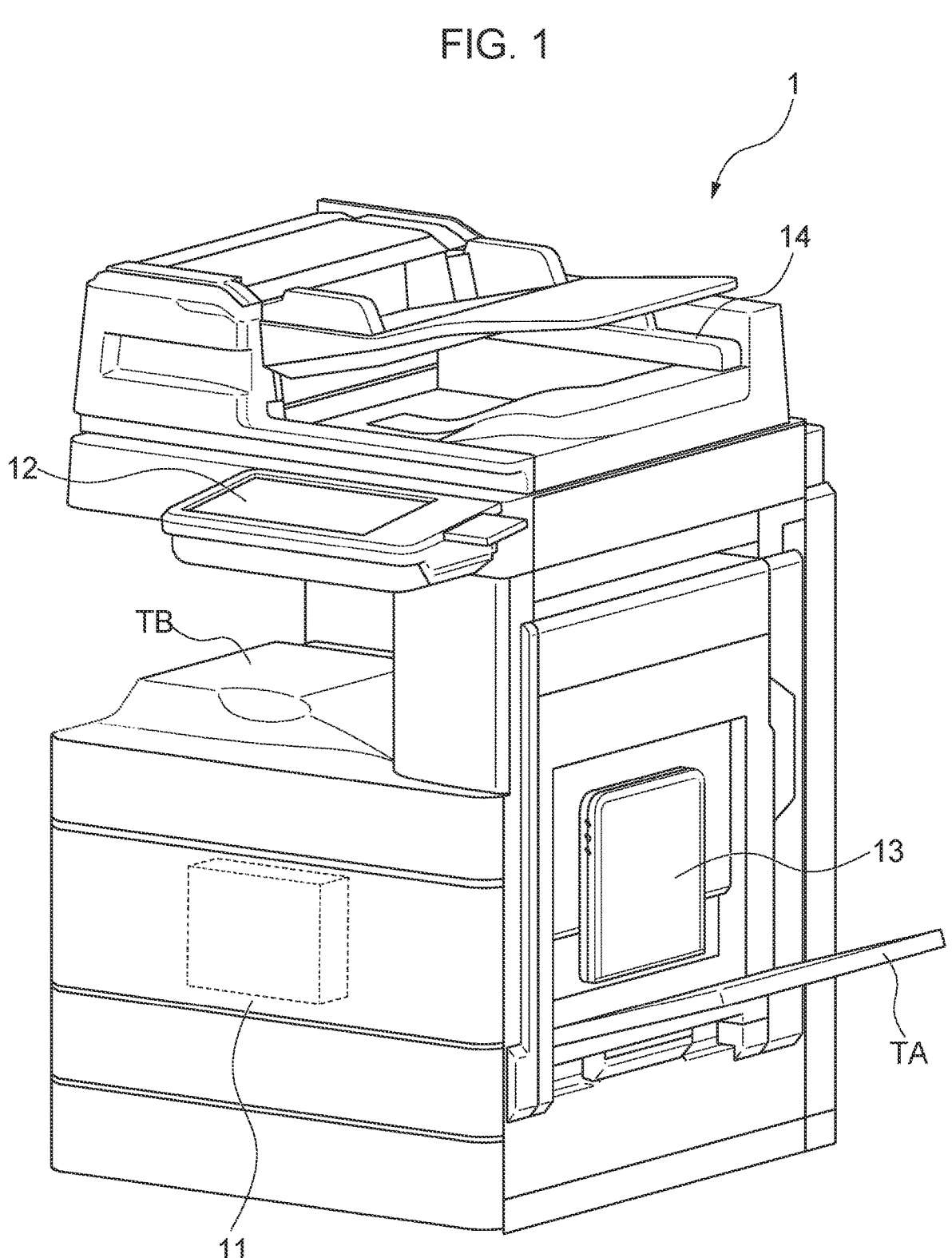
FIG. 1 is a diagram illustrating a configuration of an image forming apparatus according to an embodiment.

Next, an embodiment of the present disclosure will be described in detail with reference to the drawings. The present disclosure is not limited to the embodiment described below.

An image forming apparatus according to an embodiment will be described with reference to the drawings. In the drawings, the same reference number is assigned to the same components. An image forming apparatus 1 according to the embodiment will be described below.

(Configuration of Image Forming Apparatus)

An example of a configuration of the image forming apparatus 1 will be described with reference to FIG. 1. FIG. 1 is a diagram illustrating an example of a configuration of the image forming apparatus 1 according to the embodiment.

The image forming apparatus 1 forms an image on a printing medium and is, for example, a multi-functional peripheral, a copier, or a printer. The image forming apparatus 1 is disposed in, for example, a workplace. The image forming apparatus 1 performs a process, such as image formation, on a printing medium. The printing medium may be any sheet-like medium on at least one side of which an image can be formed. For example, the printing medium is a printing sheet or a plastic film.

The image forming apparatus 1 identifies a type of printing medium, on which a process desired by the user is to be performed, based on an operation received from the user. Printing media are classified according to their size, thickness, and material and whether the printing media has a wireless tag. A printing medium having a wireless tag indicates a printing medium to which a wireless tag is attached. A printing medium not having a wireless tag indicates a printing medium to which no wireless tag is attached.

Figure 2:
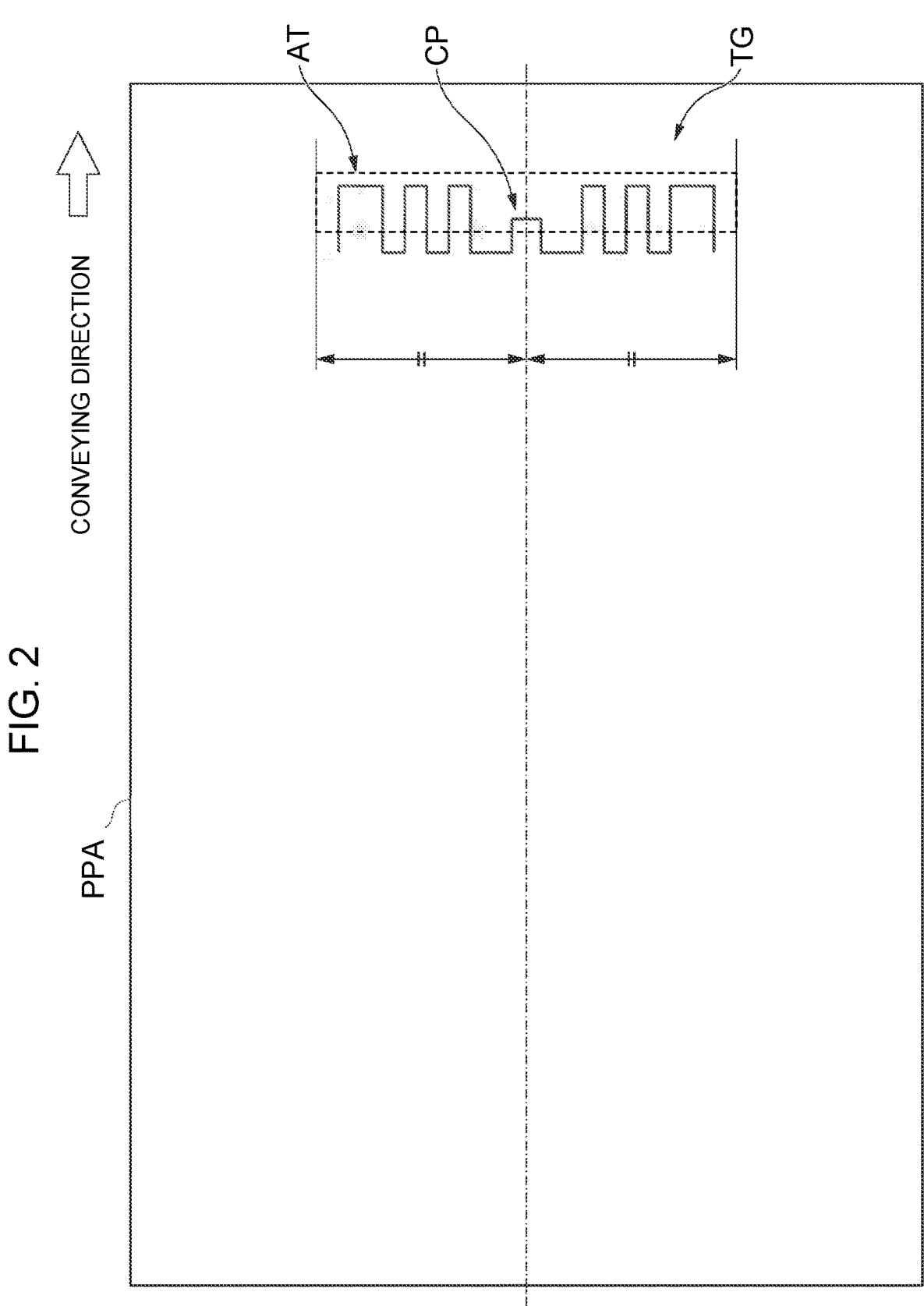
FIG. 2 is a diagram illustrating a layout of a printing medium to which a wireless tag is attached according to the embodiment.

The wireless tag is, for example, but not limited to, a radio frequency identification (RFID) tag. FIG. 2 is a diagram illustrating an example of a layout of a printing medium to which a wireless tag is attached. An arrow illustrated in FIG. 2 indicates a conveying direction in which the printing medium is conveyed in the image forming apparatus 1. A printing medium PPA illustrated in FIG. 2 is an example of a printing medium to which a wireless tag is attached. A wireless tag TG illustrated in FIG. 2 is an example of a wireless tag attached to the printing medium PPA. The wireless tag TG includes an integrated circuit (IC) chip CP and an antenna AT. Tag information is written to and read from the IC chip CP. The antenna AT is connected to the IC chip CP and configured to receive tag information to be written to the IC chip CP and transmit the tag information read from the IC chip CP.

The image forming apparatus 1 forms an image on a printing medium the type of which has been identified in advance based on an operation received from the user. For example, when a printing medium, the type of which has been identified in advance based on an operation received from the user, is a printing medium having a wireless tag, the image forming apparatus 1 writes tag information to the wireless tag attached to the printing medium. After the tag information is written to the wireless tag, the image forming apparatus 1 performs a verification process to determine whether the writing of the tag information to the wireless tag has been successfully completed. In the verification process, the image forming apparatus 1 reads the tag information written to the wireless tag and determines whether the read tag information matches the written tag information. When it is determined that the read tag information matches the written tag information, the image forming apparatus 1 determines that the writing has been completed successfully. On the other hand, when it is determined that the read tag information does not match the written tag information, the image forming apparatus 1 determines that the writing has not been completed successfully. When determining that the writing has not been completed successfully in the verification process, the image forming apparatus 1 displays information indicating that the writing has failed. On the other hand, when determining that the writing has been completed successfully in the verification process, the image forming apparatus 1 forms an image on the printing medium having the wireless tag to which the tag information has been written. After forming the image on the printing medium, the image forming apparatus 1 heats the printing medium on which the image has been formed to fix the image to the printing medium. After fixing the image to the printing medium, the image forming apparatus 1 discharges the printing medium to which the image has been fixed.

The image forming apparatus 1 discharges the printing medium having the wireless tag to which the tag information has been written in this manner, and then reads the tag information written to the wireless tag on the discharged printing medium in accordance with a received operation. After reading the tag information, the image forming apparatus 1 displays the read tag information. This enables the user to confirm, separately from the verification process, whether the tag information written to the wireless tag on the printing medium is desired tag information by using the image forming apparatus 1. This configuration of the image forming apparatus 1 eliminates the need for the user to prepare another device, such as a reading device, to read the tag information from the wireless tag. That is, the image forming apparatus 1 makes it possible to reduce the time and effort required for the user to confirm the tag information written to the wireless tag. In other words, the image forming apparatus 1 enables the user to easily confirm the tag information. Thus, the image forming apparatus 1 eliminates the need for the user to prepare an additional device and thereby makes it possible to prevent an increase in the introduction cost of a system including the image forming apparatus 1.

The image forming apparatus 1 includes, for example, a printer unit 11, a control panel 12, a wireless tag communication device 13, an image reading device 14, a manual feed tray TA, and a sheet discharge tray TB. The image forming apparatus 1 may also include other devices and components in addition to the printer unit 11, the control panel 12, the wireless tag communication device 13, the image reading device 14, the manual feed tray TA, and the sheet discharge tray TB. The image forming apparatus 1 may be configured to not include the wireless tag communication device 13. In this case, the wireless tag communication device 13 is connected for communication to the image forming apparatus 1 as an external device. The image forming apparatus 1 may be configured to not include the image reading apparatus 14. In this case, the image reading apparatus 14 may be connected for communication to the image forming apparatus 1 as an external device, or no image reading apparatus may be connected to the image forming apparatus 1.

The printer unit 11, for example, conveys a printing medium and forms an image on the printing medium. Details of the configuration of the printer unit 11 will be described later. In FIG. 1, for brevity, the printer unit 11 provided in the image forming apparatus 1 is illustrated as a rectangular parallelepiped object.

The control panel 12 includes an operation receiving unit and a display unit.

The operation receiving unit receives an operation from the user. The operation receiving unit is an input device, such as a touch pad or input keys. The operation receiving unit outputs information indicating an operation received from the user to a control unit that controls the image forming apparatus 1.

The display unit displays an image corresponding to an operation received via the operation receiving unit. The display unit is an image display device (or a display) and is, for example, a liquid crystal display or an organic electroluminescence (EL) display. Note that the display unit may be integrated with the operation receiving unit as a touch panel.

Figure 3:
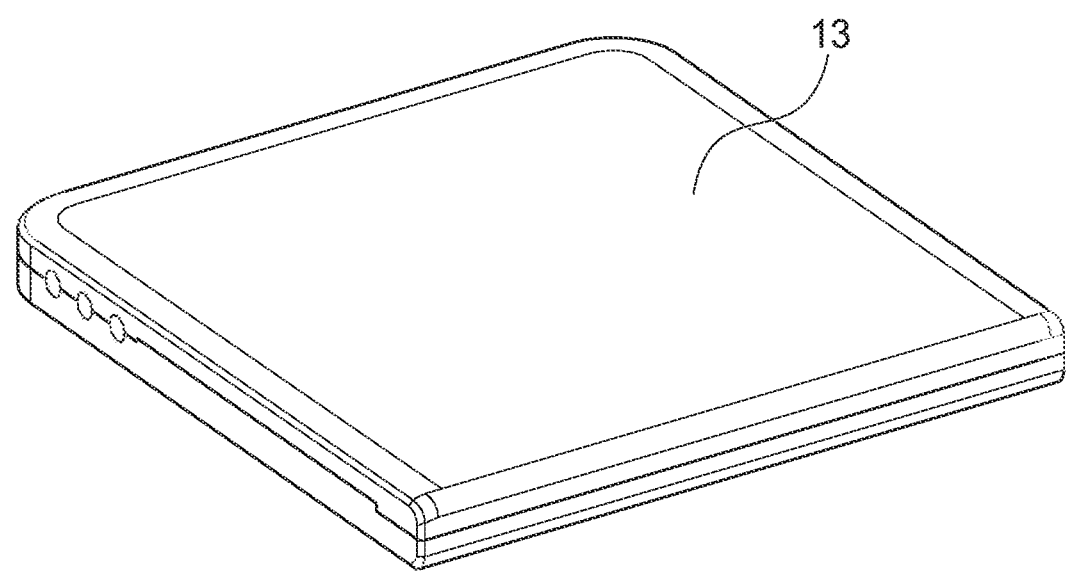
FIG. 3 is a diagram illustrating an external appearance of a wireless tag communication device according to the embodiment.

The wireless tag communication device 13 radiates radio waves to a first area RA and a second area RB located upstream of the first area RA, the first area RA and the second area RB being on a conveyance path along which a printing medium is conveyed in the image forming apparatus 1. FIG. 3 is a diagram illustrating an external appearance of the wireless tag communication device 13. The wireless tag communication device 13 includes a housing shaped like a flat plate as illustrated in FIG. 3 and an antenna 131 (see FIGS. 5 and 6) that is disposed in the housing and radiates radio waves to the first area RA and the second area RB. In FIG. 3, the antenna 131 is hidden inside of the housing. The wireless tag communication device 13 radiates radio waves in a radial direction that is among directions orthogonal to two surfaces of the housing and goes from one of the two surfaces toward the other one of the two surfaces. For convenience of explanation, one of the two surfaces facing the radial direction is referred to as a front surface of the wireless tag communication device 13. Also, for convenience of explanation, the other one of the two surfaces facing a direction opposite to the radial direction is referred to as a rear surface of the wireless tag communication device 13.

The wireless tag communication device 13 is attached to the image forming apparatus 1 by a predetermined method, and electric power is supplied from the image forming apparatus 1 to the wireless tag communication device 13. Therefore, the wireless tag communication device 13 operates under the control of the image forming apparatus 1. The predetermined method is, for example, but not limited to, universal serial bus (USB) connection. The wireless tag communication device 13 may be attached to the image forming apparatus 1 via a spacer. The position of the wireless tag communication device 13 relative to each of the first area RA and the second area RB of the image forming apparatus 1 is adjusted by the spacer. This means that the reception sensitivity of radio waves from the wireless tag communication device 13 in each of the first area RA and the second area RB can be adjusted by the spacer.

The antenna 131 is, for example, a single antenna that radiates radio waves to the first area RA and the second area RB. The antenna 131 may be implemented by multiple antennas instead of a single antenna. The antenna 131 may be a type of antenna capable of electromagnetically changing the radiation direction of radio waves or a type of antenna incapable of electromagnetically changing the radiation direction of radio waves.

Figure 4:
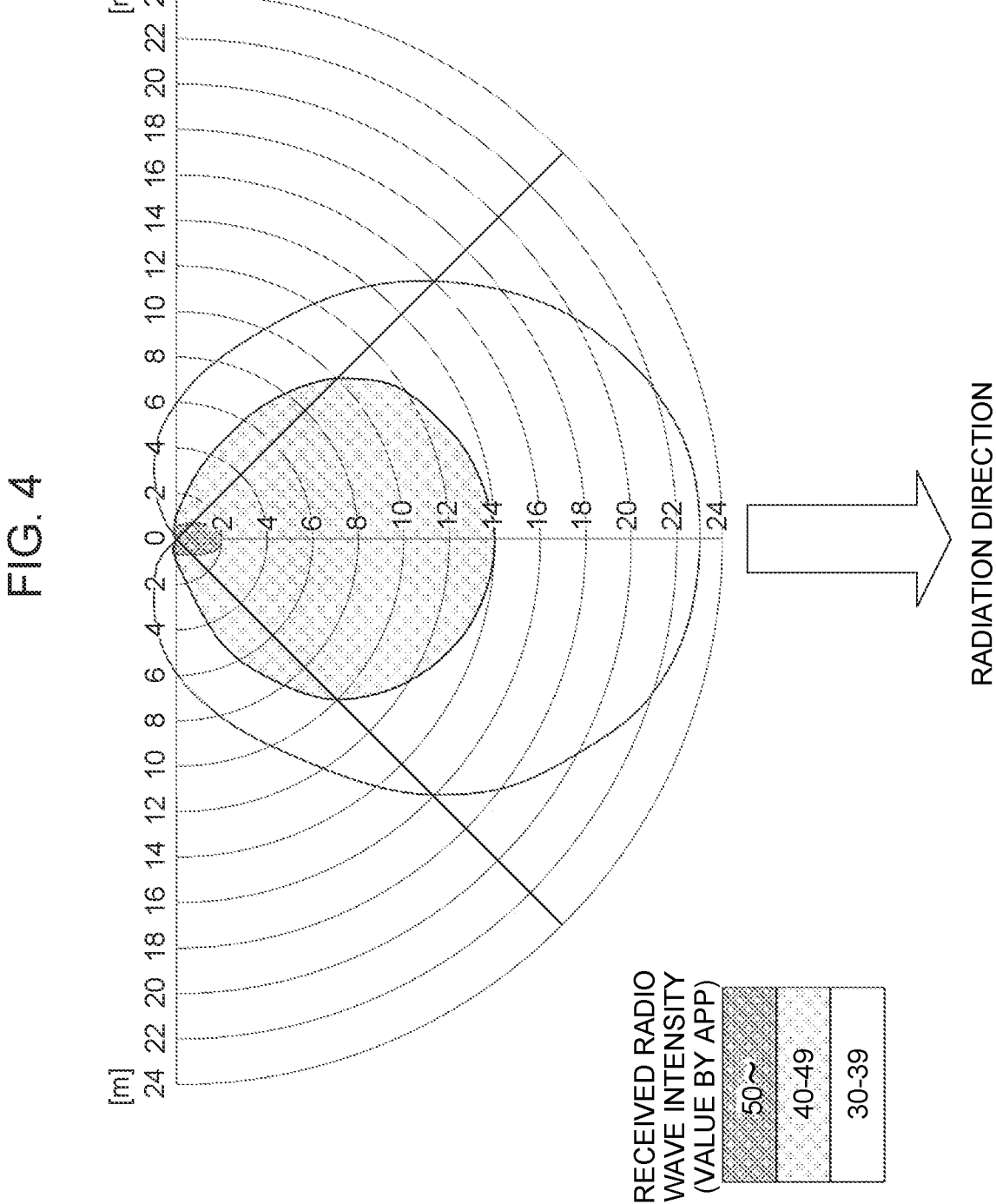
FIG. 4 is a diagram illustrating a radiation plane of a radio wave radiated from an antenna according to the embodiment.

FIG. 4 is a diagram illustrating an example of a radiation plane of a radio wave radiated from the antenna 131. The direction indicated by an arrow in FIG. 4 indicates a radiation direction in which the radio wave is radiated from the antenna 131. The origin of the coordinate axis shown in FIG. 4 indicates the position of the antenna 131. As illustrated in FIG. 4, the radio wave radiated from the antenna 131 is also radiated in a direction orthogonal to the radiation direction, a direction opposite to the radiation direction, and the like. Therefore, the wireless tag communication device 13 can radiate radio waves to multiple areas determined in advance in the image forming apparatus 1 depending on the position in which the wireless tag communication device 13 is installed. That is, the wireless tag communication device 13 can radiate radio waves to the first area RA and the second area RB.

The polarization direction of the radio wave radiated from the antenna 131 is changed by a control unit that controls the image forming apparatus 1. The control unit may automatically change the polarization direction or may change the polarization direction in accordance with an operation received from the user. In the present embodiment, detailed descriptions of polarization directions used for writing tag information to a wireless tag and for reading the tag information from the wireless tag are omitted.

The wireless tag communication device 13 causes the antenna 131 to radiate radio waves toward the first area RA and the second area RB under the control of the control unit that controls the image forming apparatus 1. With this configuration, the wireless tag communication device 13 can write tag information to a wireless tag attached to a printing medium and read the tag information from the wireless tag. Any known method or any method to be developed may be used to write tag information to a wireless tag. Therefore, descriptions of the method for writing tag information to a wireless tag are omitted. Any known method or any method to be developed may be used to read tag information from a wireless tag. Therefore, descriptions of the method for reading tag information from a wireless tag are omitted.

The image reading apparatus 14 reads, from a sheet-like medium such as a printing medium, image data indicating an image formed on the medium and is, for example, a scanner provided in the image forming apparatus 1. In the present embodiment, detailed descriptions of the configuration of the image reading apparatus 14 are omitted.

(Configuration of Printer Unit)

Figure 5:
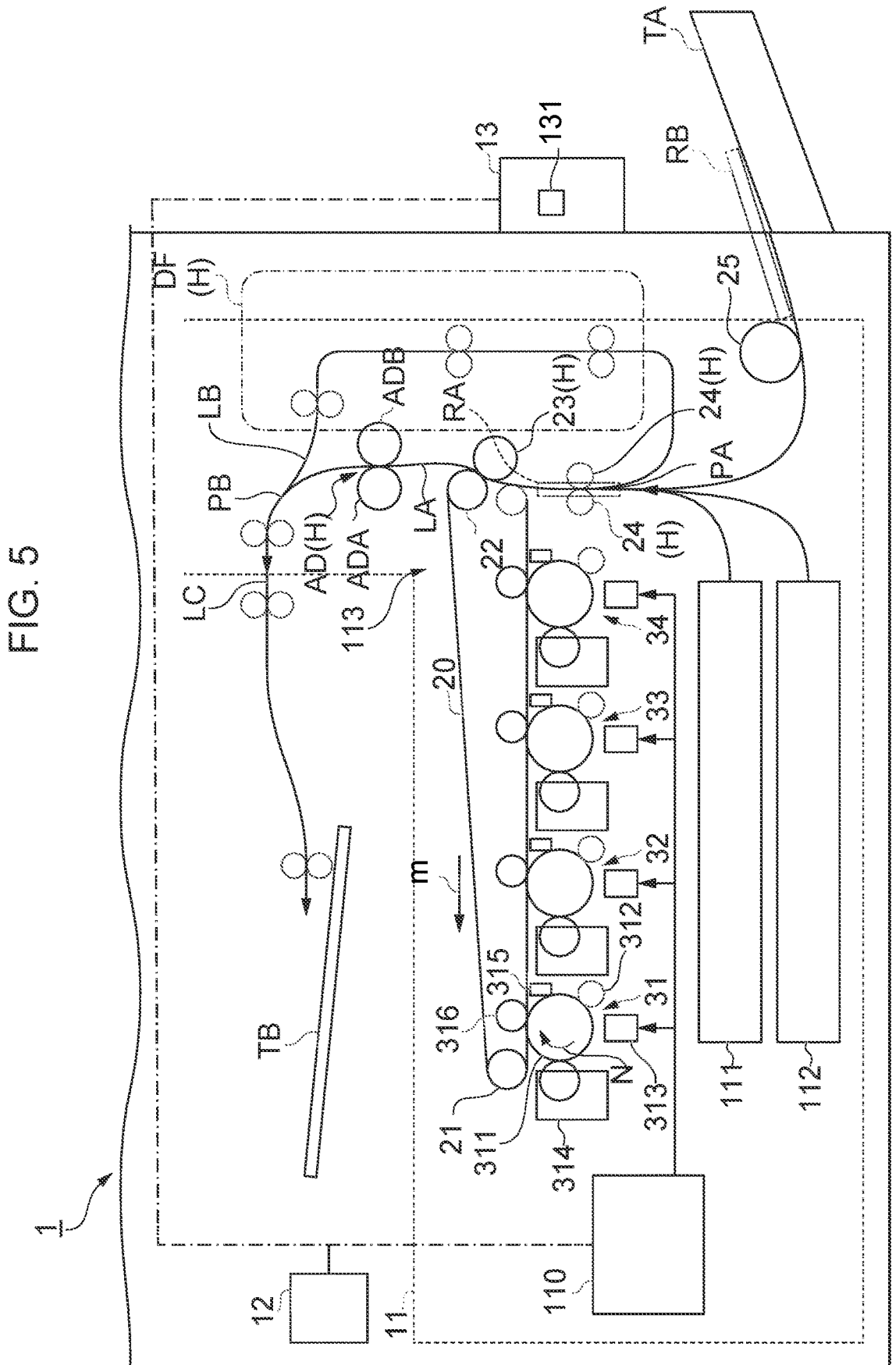
FIG. 5 is a simplified diagram illustrating a configuration of a printer unit according to the embodiment.

Next, the configuration of the printer unit 11 will be described with reference to FIG. 5. FIG. 5 is a simplified diagram illustrating an example of the configuration of the printer unit 11. In FIG. 5, which is a simplified diagram, the position of the control panel 12 is different from the position of the control panel 12 in the image forming apparatus 1 shown in FIG. 1.

The printer unit 11 includes a control unit 110, a sheet feed cassette 111, a sheet feed cassette 112, and an image forming unit 113.

The control unit 110 controls the entire image forming apparatus 1. In other words, the control unit 110 controls each of the printer unit 11, the control panel 12, the wireless tag communication device 13, and the image forming unit 113. The control unit 110 is an example of a control unit that controls the image forming apparatus 1.

The sheet feed cassette 111 stores printing media of a type desired by the user. As an example, the sheet feed cassette 111 stores printing media each of which has a wireless tag.

The sheet feed cassette 112 stores printing media of a type desired by the user. As an example, the sheet feed cassette 112 stores printing media having no wireless tag.

The image forming unit 113 conveys a printing medium and forms an image indicated by image data acquired from the control unit 110 on the printing medium under the control of the control unit 110. The image forming unit 113 is an example of an image forming mechanism. For example, the image data is acquired from an information processing apparatus connected for communication to the image forming apparatus 1 or read by the image reading apparatus 14.

The image forming unit 113 includes an intermediate transfer belt 20. The image forming unit 113 includes a driven roller 21, a backup roller 22, a secondary transfer roller 23, two registration rollers 24, and a manual feed roller 25. The image forming unit 113 includes four image forming stations: an image forming station 31, an image forming station 32, an image forming station 33, and an image forming station 34. The image forming unit 113 includes a fixing device AD and a duplex feeder DF.

The intermediate transfer belt 20 is a belt to which a toner image is primarily transferred by the four image forming stations. The intermediate transfer belt 20 is supported by the driven roller 21, the backup roller 22, and the like. The intermediate transfer belt 20 rotates in a direction indicated by an arrow m in FIG. 5. More specifically, the image forming unit 113 rotates the intermediate transfer belt 20 in this direction by a motor (not shown) under the control of the control unit 110.

The image forming station 31 forms a Y (yellow) image. The image forming station 32 forms an M (magenta) image. The image forming station 33 forms a C (cyan) image. The image forming station 34 forms a K (black) image. In the image forming unit 113, the four image forming stations are arranged below the intermediate transfer belt 20 along the rotation direction of the intermediate transfer belt 20.

The image forming station 31 includes a photoconductor drum 311, a charger 312, an exposure scanning head 313, a developing device 314, a photoconductor cleaner 315, and a primary transfer roller 316. In the image forming station 31, the charger 312, the exposure scanning head 313, the developing device 314, the photoconductor cleaner 315, and the primary transfer roller 316 are disposed around the photoconductor drum 311 that rotates in a direction indicated by an arrow N in FIG. 5. The primary transfer roller 316 faces the photosensitive drum 311 via the intermediate transfer belt 20.

The configurations of the image forming station 32, the image forming station 33, and the image forming station 34 are substantially the same as the configuration of the image forming station 31. Therefore, descriptions of the configurations of the image forming station 32, the image forming station 33, and the image forming station 34 are omitted here.

The secondary transfer roller 23 faces the backup roller 22 via the intermediate transfer belt 20. The secondary transfer roller 23 secondarily transfers a toner image primarily transferred to the intermediate transfer belt 20 to a printing medium passing between the secondary transfer roller 23 and the intermediate transfer belt 20.

The two registration rollers 24 convey a printing medium taken out from one of the sheet feed cassette 111, the sheet feed cassette 112, and the manual feed tray TA by a conveying device (not shown) to the nip between the secondary transfer roller 23 and the intermediate transfer belt 20.

The manual feed roller 25 takes out a printing medium from the manual feed tray TA and conveys the printing medium to the two registration rollers 24.

The fixing device AD fixes a toner image to a printing medium after the toner image is secondarily transferred to the printing medium by the secondary transfer roller 23. More specifically, the fixing device AD heats the printing medium while the printing medium is being conveyed by rollers, and thereby fixes the toner image to the printing medium.

The duplex feeder DF conveys a printing medium, to the front side of which a toner image has been fixed by the fixing device AD, back to the two resistant rollers 24. Before being conveyed to the duplex feeder DF, the printing medium is turned upside down. Therefore, after the printing medium is conveyed to the nip between the two registration rollers 24 via the duplex feeder DF, an image is formed on the back side of the printing medium by the secondary transfer roller 23 and the fixing device AD.

(Operations of Image Forming Unit)

Next, operations of the image forming unit 113 will be described.

First, operations of the four image forming stations will be described by taking the image forming station 31 as an example.

In the image forming station 31, the photoconductor drum 311 is charged by the charger 312, and then the photoconductor drum 311 is exposed by the exposure scanning head 313. As a result, an electrostatic latent image is formed on the photoconductor drum 311. Then, the developing device 314 develops the electrostatic latent image on the photosensitive drum 311. The developing device 314 develops the electrostatic latent image on the photosensitive drum 311 to form a toner image by using a two-component developer comprised of toner and a carrier. The primary transfer roller 316 primarily transfers the toner image formed on the photoconductor drum 311 to the intermediate transfer belt

20. After the primary transfer, the photoconductor cleaner 315 removes toner remaining on the photoconductor drum 311.

The image forming station 31, the image forming station 32, the image forming station 33, and the image forming station 34 form a color toner image on the intermediate transfer belt 20 by using the primary transfer rollers 316. The color toner image is formed by sequentially superimposing Y (yellow), M (magenta), C (cyan), and K (black) toner images on each other.

Next, the operation of the secondary transfer roller 23 will be described. The secondary transfer roller 23 secondarily transfers the color toner image on the intermediate transfer belt 20 to a printing medium passing through the nip between the secondary transfer roller 23 and the intermediate transfer belt 20. In the descriptions below, a "toner image" may be either a color toner image or a monochrome toner image. The toner image may also be formed by using decoloring toner.

Next, an operation of the image forming unit 113 related to the conveyance of a printing medium will be described. For convenience of explanation, an end of a printing medium facing the conveying direction is referred to as a leading end of the printing medium. For convenience of explanation, an end of a printing medium facing a direction opposite to the conveying direction is referred to as a trailing end of the printing medium.

At the nip between the two registration rollers 24, a printing medium taken out from one of the sheet feed cassette 111, the sheet feed cassette 112, and the manual feed tray TA is warped by a conveying device (not shown). As a result, the leading end of the printing medium is aligned. Then, the two registration rollers 24 convey the printing medium to the nip between the secondary transfer roller 23 and the intermediate transfer belt 20 in accordance with the timing at which the image forming unit 113 transfers the toner image to the printing medium. The conveyance paths, along which printing media taken out from the sheet feed cassette 111, the sheet feed cassette 112, and the manual feed tray TA are conveyed to the two registration rollers 24, are merged at a merging point PA shown in FIG. 5.

In the image forming unit 113, three conveyance paths including a conveyance path LA, a conveyance path LB, and a conveyance path LC are formed by the two registration rollers 24, the fixing device AD, and multiple rollers in the duplex feeder DF. The conveyance path LA extends from the merging point PA to a branching point PB illustrated in FIG. 5. The conveyance path LB passes through the duplex feeder DF and extends from the branching point PB to the merging point PA. The conveyance path LC extends from the branching point PB to the sheet discharge tray TB.

The two registration rollers 24 start to rotate in accordance with the position of the toner image on the intermediate transfer belt 20 being rotated, and move the printing medium to the secondary transfer roller 23. As a result, the toner image formed on the intermediate transfer belt 20 is secondarily transferred to the printing medium by the secondary transfer roller 23. After the toner image is secondarily transferred to the printing medium, the secondary transfer roller 23 conveys the printing medium to the fixing device AD along the conveyance path LA.

For example, the fixing device AD heats and presses the toner image secondarily transferred to the printing medium conveyed from the secondary transfer roller 23 while conveying the printing medium. Thus, the fixing device AD fixes the toner image to the printing medium. The fixing device AD performs the heating and the pressing by using a fixing member ADA and a pressing member ADB.

The fixing member ADA has an endless peripheral surface. For example, the fixing member ADA is a belt-like component. The fixing member ADA is in contact with the outer peripheral surface of the pressing member ADB. The fixing member ADA is in contact with pressing member ADB and rotates together with the pressing member ADB. A heating unit is provided inside of the fixing member ADA. A support member that rotatably supports the fixing member ADA is provided inside of the fixing member ADA. In FIG. 5, the heating unit and the support member are omitted for simplification of the drawing.

The pressing member ADB is a roller that is in contact with the outer peripheral surface of the fixing member ADA. The driving force of a motor is transmitted to the pressing member ADB via a gear or the like. In other words, the pressing member ADB is rotated by the driving force of the motor. Thus, the pressing member ADB rotates the fixing member ADA in contact with the pressing member ADB.

The pressing member ADB is pressed against the outer peripheral surface of the fixing member ADA by a biasing member such as a spring. The pressing member ADB forms a nip with the fixing member ADA by being pressed against the fixing member ADA. In other words, the pressing member ADB forms a nip with the fixing member ADA by contacting the fixing member ADA. In the fixing device AD, instead of the configuration in which the pressing member ADB is pressed against the outer peripheral surface of the fixing member ADA by the biasing member, the fixing member ADA may be pressed against the outer peripheral surface of the pressing member ADB by a biasing member.

With the above-described configuration, the fixing device AD heats and presses the printing medium to fix the toner image to the printing medium. As a result, the toner image secondarily transferred by the secondary transfer roller 23 is formed as an image on the printing medium. The fixing device AD conveys the printing medium to the conveyance path LC after the image is formed on the printing medium. The printing medium conveyed to the conveyance path LC is discharged by rollers (not shown).

In double-sided printing, after an image is formed on the front side and the entire printing medium passes through the branch point PB, rollers (not shown) convey the printing medium to the conveyance path LB in a switchback manner. As a result, the printing medium is turned upside down. Then, multiple rollers in the duplex feeder DF convey the printing medium along the conveyance path LB to the nip between the two registration rollers 24. The printing medium turned upside down is conveyed along the conveyance path LA by the two registration rollers 24, and another toner image is fixed to the printing medium by the fixing device AD. As a result, an image is formed on the back side of the printing medium. The fixing device AD conveys the printing medium, on the back side of which the image is formed, to the conveyance path LC, and the printing medium is discharged.

Thus, the secondary transfer roller 23, the two registration rollers 24, the fixing device AD, and the rollers in the duplex feeder DF constitute a conveyance unit H or a conveyance mechanism that conveys a printing medium in the image forming apparatus 1.

(Difference Between First Area and Second Area)

Next, a difference between the first area RA and the second area RB will be described. For convenience of explanation, the sheet feed cassette 111, the sheet feed cassette 112, and the manual feed tray TA will be collectively referred to as a sheet feeding unit or a sheet feeder unless it is necessary to distinguish between them. This is because each of the sheet feed cassette 111, the sheet feed cassette 112, and the manual feed tray TA feeds a printing medium to the printer unit 11, that is, supplies a printing medium to the printer unit 11.

The first area RA is on the conveyance path along which a printing medium is conveyed by the conveyance unit H located downstream of the sheet feeding unit. More specifically, the first area RA is an area where a printing medium contacts the two registration rollers 24. For example, the control unit 110 controls the conveyance unit H such that a printing medium taken out from the sheet feeding unit is warped at the nip between the two registration rollers 24 and is then conveyed by the two registration rollers 24 by a predetermined distance in the conveying direction. The predetermined distance is, for example, about one half of the length in the conveyance direction of the printing medium warped at the nip. After the printing medium is conveyed by the two registration rollers 24 by the predetermined distance, the control unit 110 temporarily stops the conveyance of the printing medium by the conveyance unit H. Then, the control unit 110 controls the antenna 131 to write tag information to the wireless tag attached to the printing medium the conveyance of which by the conveyance unit H is temporarily stopped and to perform a verification process for the written tag information. In this case, the first area RA contains the printing medium. That is, the first area RA is an area where the printing medium contacts the two registration rollers 24. In FIG. 5, the first area RA is surrounded by a dotted line. The predetermined distance may be any distance in the conveyance direction that is less than one half of the length of the printing medium warped at the nip. The predetermined distance may be 0 mm. When the predetermined distance is 0 mm, the first area RA contains the printing medium warped at the nip. Also, in this case, the first area RA is an area where the printing medium contacts the two registration rollers 24.

On the other hand, the second area RB is set in advance in an area where the printing medium is placed on the sheet feeding unit. Therefore, the second area RB is an area where the printing medium does not contact the two registration rollers 24. The second area RB may be set in advance in one or more of the sheet feed cassette 111, the sheet feed cassette 112, and the manual feed tray TA. For example, the second area RB may be set in advance on the manual feed tray TA. In this case, on the manual feed tray TA, the second area RB intersects the radiation plane of a radio wave from the antenna 131 and overlaps the antenna 131 when viewed in the direction of gravity. In FIG. 5, the second area RB is surrounded by a dotted line above the manual feed tray TA.

Figure 6:
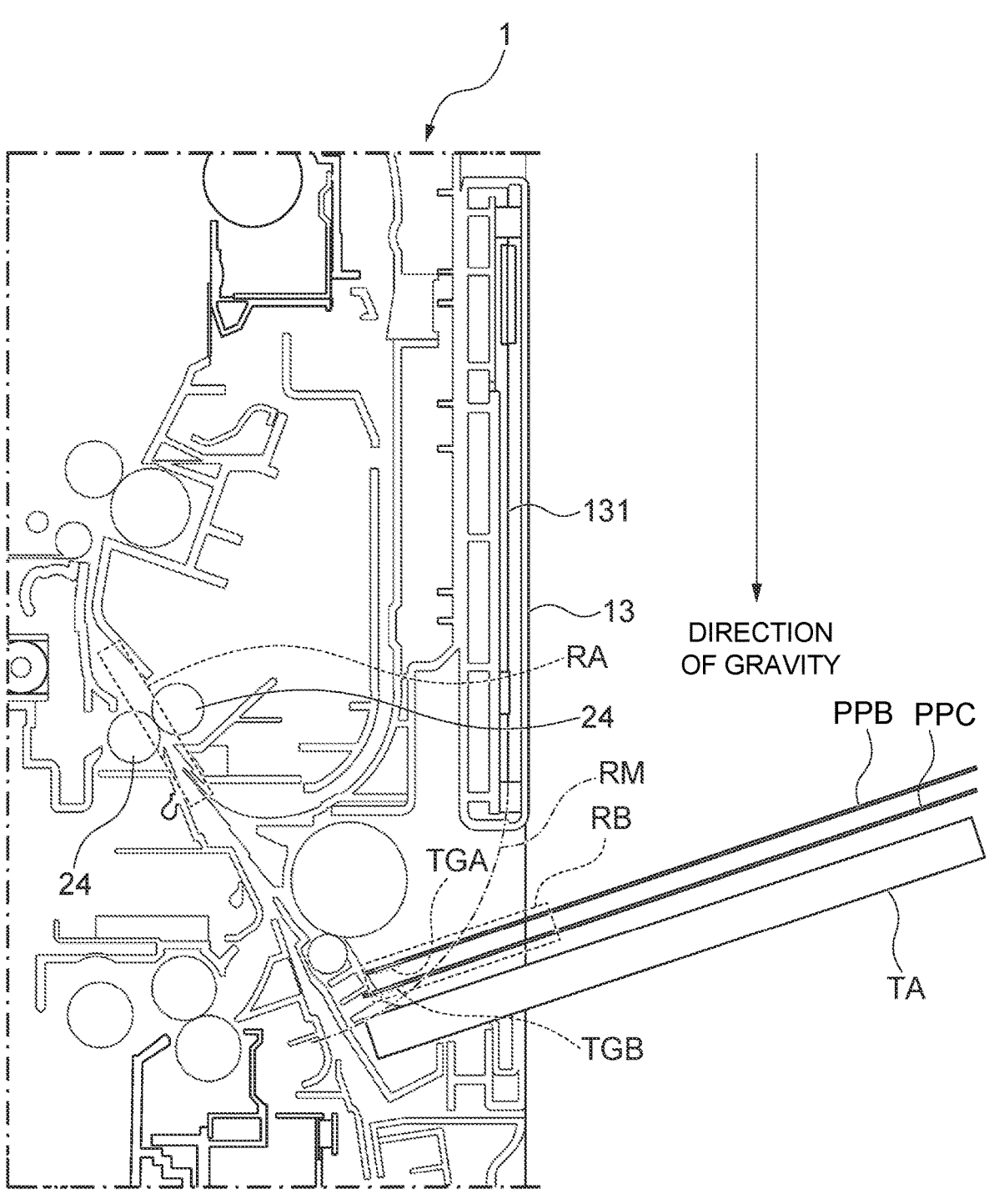
FIG. 6 is a diagram illustrating an example of the positional relationship between a first area RA and a second area RB according to the embodiment.

FIG. 6 is a diagram illustrating an example of the positional relationship between the first area RA and the second area RB. An arrow shown in FIG. 6 indicates the direction of gravity. For convenience of explanation, an end of the manual feed tray TA facing a direction in which a printing medium is inserted into the manual feed tray TA will be referred to as a front end of the manual feed tray TA. Each of a printing medium PPB and a printing medium PPC illustrated in FIG. 6 is an example of a printing medium placed on the manual feed tray TA and is an example of a printing medium having a wireless tag. A wireless tag TGA illustrated in FIG. 6 is an example of a wireless tag attached to the printing medium PPB. A wireless tag TGB illustrated in FIG. 6 is an example of a wireless tag attached to the printing medium PPC. A radiation plane RM shown in FIG. 6 is an example of a part of the radiation plane of a radio wave radiated from the antenna 131, and the part of the radiation plane intersects the printing medium placed on the manual feed tray TA. As illustrated in FIG. 6, on the manual feed tray TA, the second area RB intersects the radiation plane RM of the radio wave from the antenna 131 and overlaps the antenna 131 when viewed in the direction of gravity. In the example illustrated in FIG. 6, the second area RB intersects the radiation plane RM at a position closer to the front end of the manual feed tray TA than the antenna 131 when viewed in the direction of gravity. The second area RB may be set to intersect the radiation plane RM at a position below the antenna 131, or may be set to intersect the radiation plane RM at a position closer to the rear end of the manual feed tray TA than the antenna 131.

In the second area RB, the wireless tag on the printing medium placed on the manual feed tray TA is located closer to the front end of the manual feed tray TA than the radiation plane RM of the radio wave radiated from the antenna 131. Therefore, the control unit 110 can control the antenna 131 to read tag information from the wireless tag on the printing medium placed on the manual feed tray TA. In the example illustrated in FIG. 6, in the second area RB, the wireless tag TGA of the printing medium PPB placed on the manual feed tray TA is located closer to the front end of the manual feed tray TA than the radiation plane RM. In other words, the wireless tag TGA disposed on the printing medium PPB is located closer to the leading end of the printing medium PPB than to the trailing end of the printing medium PPB. In this example, in the second area RB, the wireless tag TGB on the printing medium PPC placed on the manual feed tray TA is located closer to the front end of the manual feed tray TA than the radiation plane RM. In other words, the wireless tag TGB disposed on the printing medium PPC is located closer to the leading end of the printing medium PPC than to the trailing end of the printing medium PPC.

(Functional Configuration of Control Unit)

Figure 7:
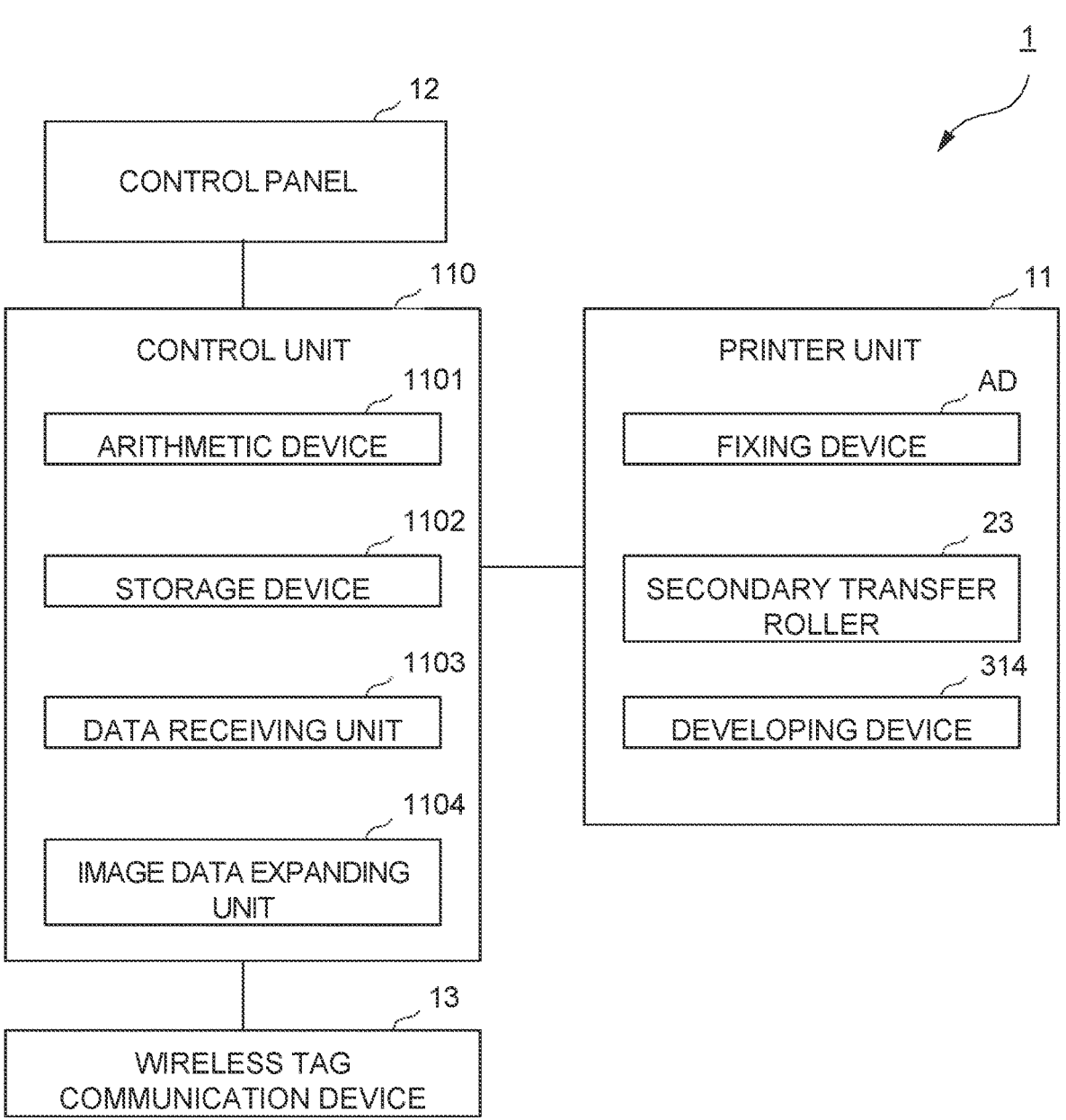
FIG. 7 is a diagram illustrating a functional configuration of a control unit according to the embodiment.

Next, a functional configuration of the control unit 110 will be described with reference to FIG. 7. FIG. 7 is a diagram illustrating an example of a functional configuration of the control unit 110.

As illustrated in FIG. 7, the control unit 110 is connected for communication to each of the printer unit 11, the control panel 12, and the wireless tag communication device 13. The control unit 110 includes an arithmetic device 1101, a storage device 1102, a data receiving unit 1103, and an image data expanding unit 1104.

The arithmetic device 1101 is a processor such as a central processing unit (CPU) or an application specific integrated circuit (ASIC). The arithmetic device 1101 controls each of the printer unit 11, the control panel 12, and the wireless tag communication device 13 in accordance with an image processing program stored in the storage device 1102.

The storage device 1102 is, for example, a read-only memory (ROM), a random access memory (RAM), a hard disk drive (HDD), or a solid state drive (SSD). The storage device 1102 may be provided separately from the control unit 110.

The data receiving unit 1103 receives print data (e.g., data written in a page description language) indicating an image to be printed from a host such as a personal computer (PC) and stores the received print data in the storage device 1102.

The image data expanding unit 1104 expands the print data stored by the data receiving unit 1103 in the storage device 1102 into data (for example, raster data) that can be printed by the printer unit 11 by, for example, setting print conditions, and stores the data in the storage device 1102.

(Process of Writing Tag Information to Wireless Tag in First Area)

Figure 8:
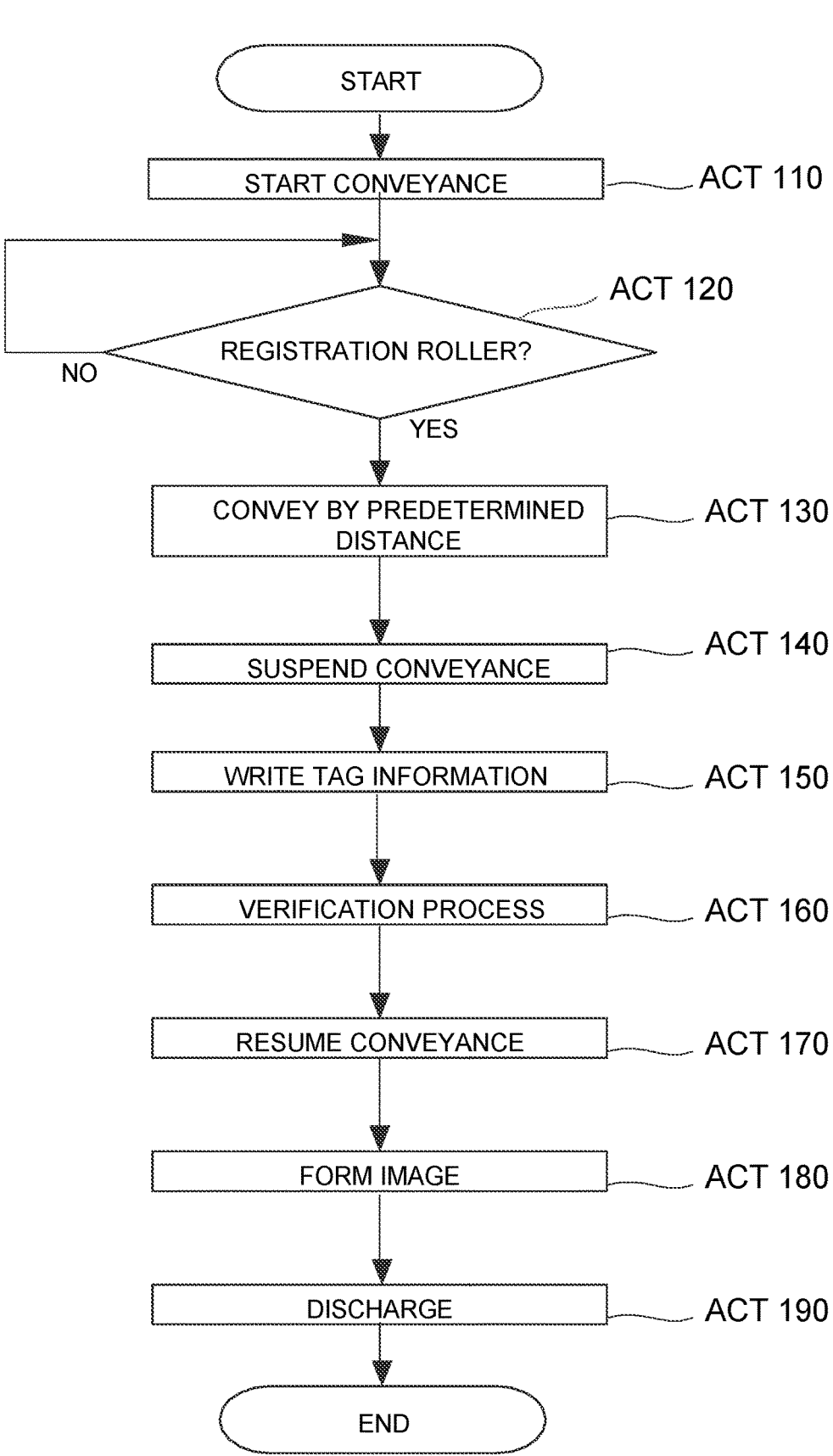
FIG. 8 is a flowchart illustrating a process of writing tag information to a wireless tag in the first area RA.

Referring to FIG. 8, a process of writing tag information to a wireless tag in the first area RA will be described. FIG. 8 is a flowchart illustrating a process of writing tag information to a wireless tag in the first area RA. In the flowchart illustrated in FIG. 8, the process of writing tag information to a wireless tag in the first area RA is performed together with a process of forming an image on a printing medium. For example, the image forming apparatus 1 performs the process of forming an image on a printing medium and the process of writing tag information to a wireless tag in response to a request from an information processing apparatus that is connected for communication to the image forming apparatus 1. In this example, it is assumed that the image forming apparatus 1 receives the request before ACT 110 in FIG. 8 is performed. It is also assumed that the request causes the image forming apparatus 1 to perform a process on one printing medium. For convenience of explanation, the request will be referred to as a print job. For convenience of explanation, the one printing medium will be referred to as a target printing medium. The target printing medium is an example of a printing medium having a wireless tag. It is further assumed that the target printing medium is placed in the sheet feed cassette 111.

After receiving the print job, the control unit 110 controls the conveyance unit H to start conveying the target printing medium placed in the sheet feed cassette 111 (ACT 110).

Next, the control unit 110 waits until the target printing medium conveyed by the conveyance unit H is warped at the nip between the two registration rollers 24 (ACT 120). In FIG. 8, ACT 120 is indicated by "REGISTRATION ROLLER?". In ACT 120, any known method or any method to be developed may be used by the control unit 110 to determine that the target printing medium has been warped at the nip.

When it is determined that the target printing medium conveyed by the conveyance unit H has been warped at the nip between the two registration rollers 24 (ACT 120: YES), the control unit 110 controls the two registration rollers 24 of the conveyance unit H to convey the target printing medium by a predetermined distance (ACT 130).

Next, the control unit 110 controls the conveyance unit H to temporarily stop the conveyance of the target printing medium (ACT 140). The control unit 110 can thereby position the target printing medium in the first area RA.

Next, the control unit 110 controls the antenna 131 to write tag information specified by the received print job to the wireless tag on the target printing medium the conveyance of which has been temporarily stopped at ACT 140 (ACT 150). The tag information is, for example, but not limited to, an electronic product code (EPC) represented by a combination of hexadecimal numbers. In ACT 150, the control unit 110 may be configured to change the polarization direction of a radio wave radiated from the antenna 131 to a polarization direction suitable for writing the tag information to the wireless tag in the first area RA, or may be configured to not change a predetermined polarization direction. In ACT 150, the control unit 110 may be configured to sequentially change the polarization direction of the radio wave radiated from the antenna 131 to each of multiple predetermined polarization directions. Also, the control unit 110 may be configured to change the polarization direction in accordance with a received operation, based on information included in the print job, or as a predetermined automatic process. In ACT 150, the control unit 110 may be configured to change the intensity of the radio wave radiated from the antenna 131 to an intensity suitable for writing the tag information to the wireless tag in the first area RA, or may be configured to not change a predetermined intensity. The control unit 110 may be configured to change the intensity in accordance with a received operation, based on information included in the print job, or as a predetermined automatic process.

Next, the control unit 110 performs a verification process to determine whether the writing of the tag information, which is specified by the received print job, to the wireless tag has been successfully completed in ACT 150 (ACT 160). Since the verification process performed by the image forming apparatus 1 is a well-known process, detailed descriptions of the verification process are omitted here.

Next, the control unit 110 controls the conveyance unit H to resume the conveyance of the target printing medium that has been temporarily stopped at ACT 140 (ACT 170).

Next, the control unit 110 controls the image forming unit 113 to form an image on the target printing medium conveyed by the conveyance unit H (ACT 180).

After the image is formed in ACT 180, the control unit 110 controls the conveyance unit H to discharge the target printing medium to the sheet discharge tray TB (ACT 190), and ends the process of the flowchart shown in FIG. 8.

As described above, the image forming apparatus 1 can write tag information to a wireless tag on a target printing medium in the first area RA.

(Process of Reading Tag Information from Wireless Tag in Second Area)

Figure 9:
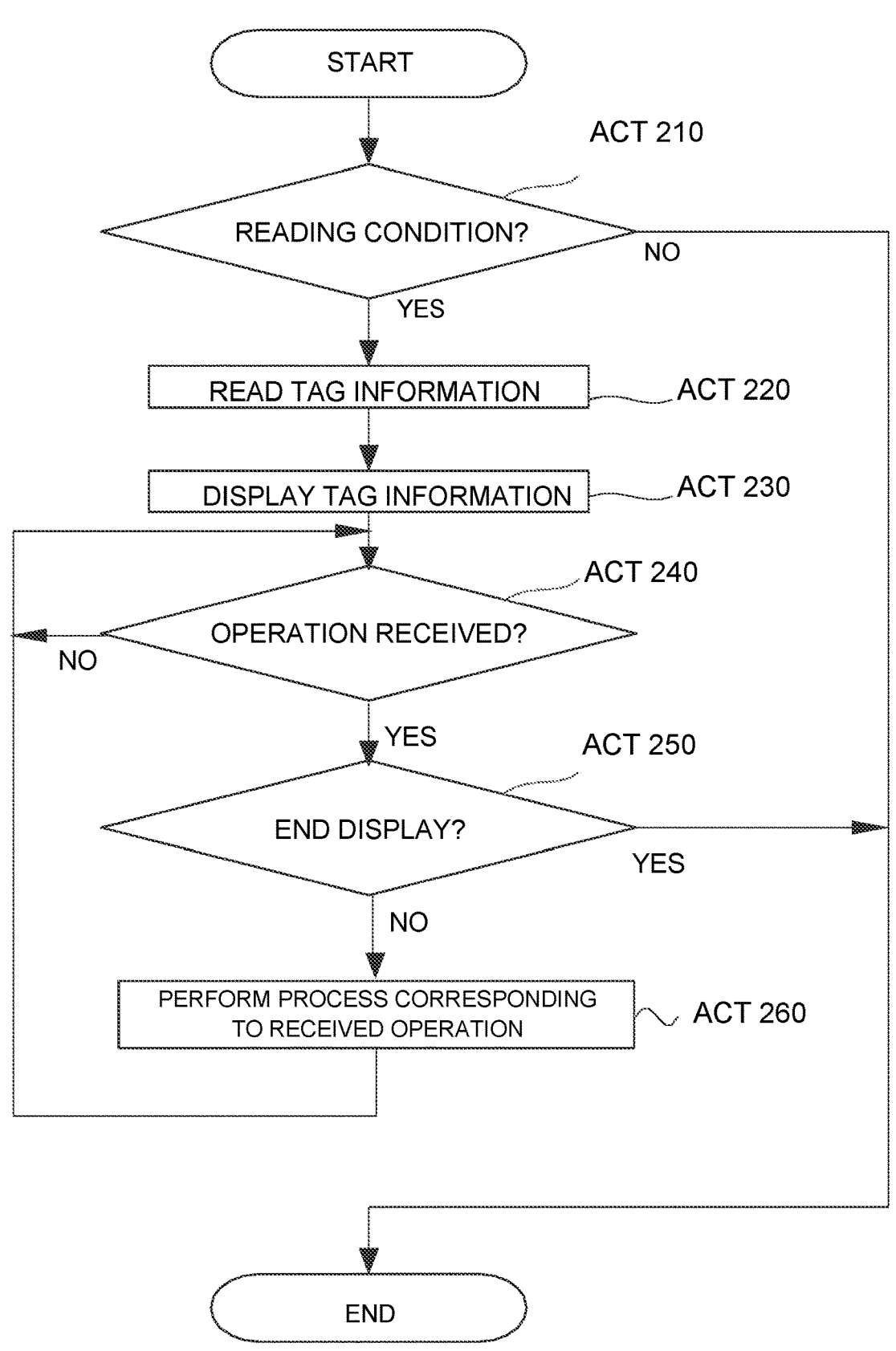
FIG. 9 is a flowchart illustrating a process of reading tag information from a wireless tag in the second area RB.

Referring to FIG. 9, a process of reading tag information from a wireless tag in the second area RB will be described. FIG. 9 is a flowchart illustrating a process of reading tag information from a wireless tag in the second area RB. For example, the image forming apparatus 1 performs the process of reading tag information written to a wireless tag on a printing medium in the second area RB in accordance with a received operation. The printing medium is, for example, the target printing medium having the wireless tag to which the tag information has been written by the process of the flowchart illustrated in FIG. 8. The target printing medium from which the tag information is read in the second area RB is the printing medium discharged to the sheet discharge tray TB after the image is formed by the image forming unit 113 and is an example of a printing medium having a wireless tag to which tag information has been written in the first area RA. The image forming apparatus 1 reads the tag information from the wireless tag on the printing medium and thereby assists the user in confirming the tag information written to the wireless tag. In other words, separately from the verification process, the user can confirm whether the tag information written to the wireless tag on the printing medium is desired tag information by using the image forming apparatus 1. Thus, the image forming apparatus 1 can reduce the time and effort required for the user to confirm tag information written to a wireless tag. The image forming apparatus 1 can also prevent an increase in the introduction cost of a system including the image forming apparatus 1.

Here, it is assumed that the second area RB is set in advance on the manual feed tray TA as illustrated in FIGS. 5 and 6. Also, it is assumed that the image forming apparatus 1 receives a read start operation for starting the process of reading tag information from a wireless tag on a printing medium placed in the second area RB before ACT 210 in FIG. 9 is performed. Furthermore, it is assumed that multiple printing media, each of which has a wireless tag to which tag information has been written, are stacked in the second area RB on the manual feed tray TA.

After receiving the read start operation, the control unit 110 determines whether a predetermined reading condition is satisfied (ACT 210). In FIG. 9, ACT 210 is indicated by "READING CONDITION?". When satisfied, the reading condition prevents tag information from being read from a wireless tag on a printing medium that is located in an area on the conveyance path other than the second area RB. For example, the reading condition requires that the read start operation is received while a printing medium is placed on the manual feed tray TA and the conveyance of the printing medium is not being performed by the conveyance unit H. In the present embodiment, the condition that the conveyance of the printing medium is not being performed by the conveyance unit H does not indicate that the conveyance of the printing medium by the conveyance unit H is temporarily stopped. Therefore, the condition that the conveyance of the printing medium is not being performed by the conveyance unit H also indicates that the printing medium is not located in the first area RA. More specifically, the condition that the conveyance of the printing medium is not being performed by the conveyance unit H indicates that the printing medium is not located in any area on the conveyance path other than an aera on the sheet feeding unit. The reading condition may also indicate requirements other than those described above as long as the reading condition prevents tag information from being read from a wireless tag on a printing medium that is located in an area on the conveyance path other than the second area RB.

When it is determined that the reading condition is not satisfied (ACT 210: NO), the control unit 110 causes the display unit of the control panel 12 to display, for example, information indicating that the reading condition is not satisfied and then ends the process of the flowchart shown in FIG. 9. The user of the image forming apparatus 1 can perform the read start operation again after the reading condition is satisfied.

On the other hand, when it is determined that the reading condition is satisfied (ACT 210: YES), the control unit 110 controls the antenna 131 to read the tag information from the wireless tags on the multiple printing media placed in the second area RB (ACT 220). In ACT 220, the control unit 110 may be configured to change the polarization direction of the radio wave radiated from the antenna 131 to a polarization direction suitable for reading the tag information from the wireless tags in the second area RB, or may be configured to not change a predetermined polarization direction. In ACT 220, the control unit 110 may be configured to sequentially change the polarization direction of the radio wave radiated from the antenna 131 to each of multiple predetermined polarization directions. The control unit 110 may be configured to change the polarization direction in accordance with a received operation or as a predetermined automatic process. For example, in ACT 220, the control unit 110 sequentially changes the polarization direction of the radio wave radiated from the antenna 131 to each of multiple predetermined polarization directions. In ACT 220, the control unit 110 may be configured to change the intensity of the radio wave radiated from the antenna 131 to an intensity suitable for reading the tag information from the wireless tags in the second area RB, or may be configured to not change a predetermined intensity. The control unit 110 may be configured to change the intensity in accordance with a received operation or as a predetermined automatic process. In the present embodiment, it is assumed that the control unit 110 changes the intensity of the radio wave radiated from the antenna 131 to an intensity corresponding to an operation received in advance. For example, the intensity corresponding to the operation is greater than the intensity of the radio wave that the antenna 131 is caused to radiate by the control unit 110 in the process of the flowchart shown in FIG. 8. With this configuration, the control unit 110 can reduce the risk of failure in reading the tag information from the wireless tags in the second area RB.

Figure 10:
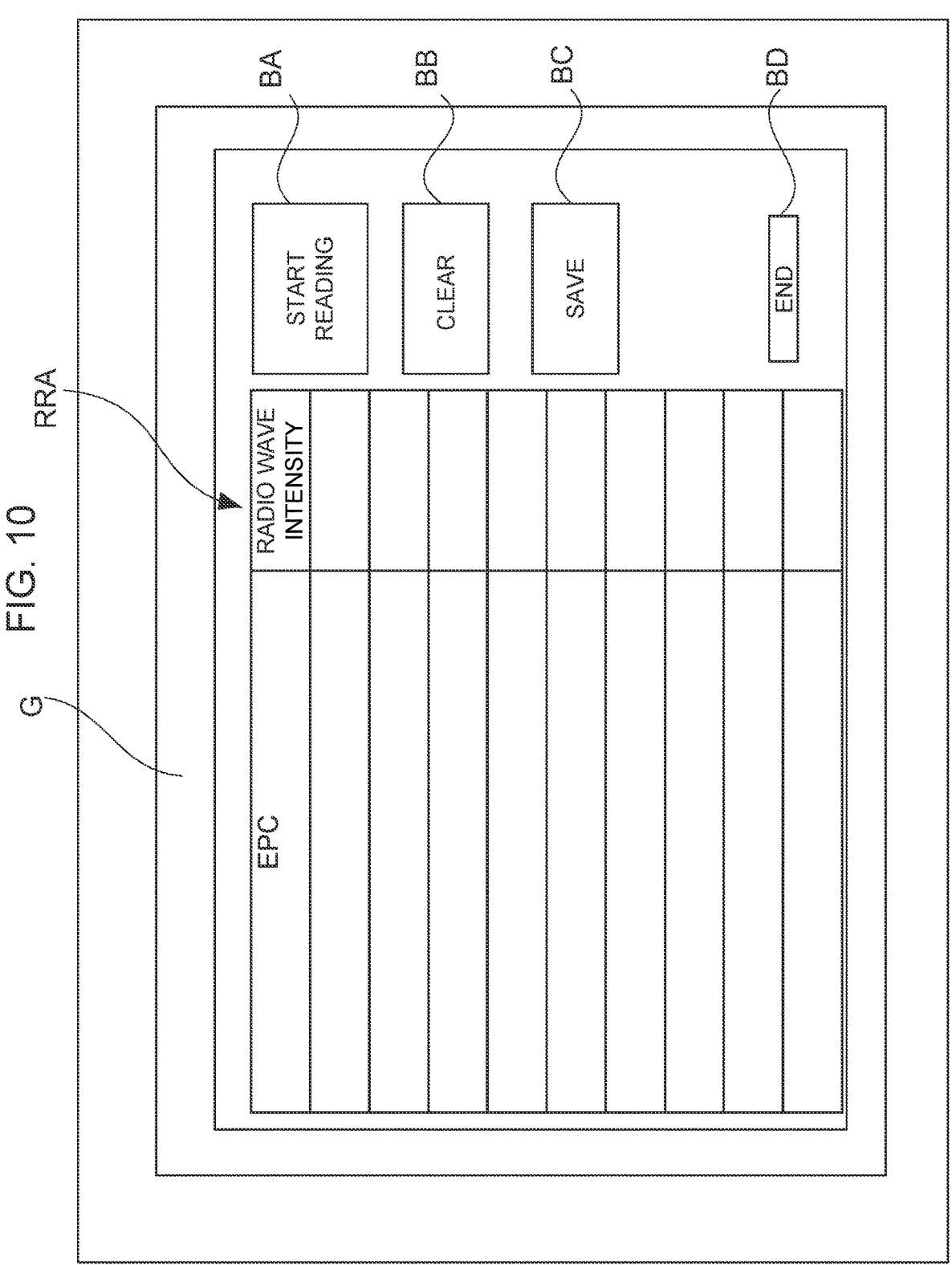
FIG. 10 is a diagram illustrating a display image including tag information according to the embodiment.

Next, the control unit 110 causes the display unit of the control panel 12 to display sets of tag information read in ACT 220 (ACT 230). FIG. 10 is a diagram illustrating an example of a display image including the tag information read in ACT 220. An image G shown in FIG. 10 is an example of a display image. In the example illustrated in FIG. 10, the image G includes an area RRA, a button BA, a button BB, a button BC, and a button BD.

The area RRA displays each set of tag information read by the control unit 110 in ACT 220 in association with radio wave intensity information indicating the intensity of a radio wave radiated from the antenna 131 and reflected by the wireless tag storing the tag information. "EPC" illustrated in FIG. 10 represents an example of tag information. "RADIO WAVE INTENSITY" illustrated in FIG. 10 represents an example of radio wave intensity information. Tag information and radio field intensity information are not displayed in the area RRA before ACT 220 is performed. That is, in the area RRA, tag information and radio wave intensity information are displayed after ACT 220 is performed.

The button BA is a graphical user interface (GUI) for receiving the read start operation. When the button BA is, for example, tapped or clicked, the control unit 110 starts the process of the flowchart shown in FIG. 9. That is, the image G is also one of images displayed on the control panel 12 of the image forming apparatus 1 to receive operations from the user.

The button BB is a GUI for receiving an operation to delete tag information and radio wave intensity information displayed in the area RRA. When the button BB is, for example, tapped or clicked, the control unit 110 deletes tag information and radio wave intensity information in the area RRA.

The button BC is a GUI for receiving an operation to store, in the storage device 1102, tag information and radio wave intensity information displayed in the area RRA. When the button BC is, for example, tapped or clicked, the control unit 110 stores tag information and radio wave intensity information displayed in the area RRA in the storage device 1102.

The button BD is a GUI for receiving an operation to terminate the display of the image G on the display unit of the control panel 12. When the button BC is, for example, tapped or clicked, the control unit 110 terminates the display of the image G on the display unit.

The image G may also have a configuration in which some or all of the buttons BA to BD are omitted. The area RRA may be configured such that radio wave intensity information is not displayed. Each of tag information read in ACT 220 is displayed on the display unit of the control panel 12 in ACT 230 so that the user can easily confirm whether the tag information written to each of the wireless tags on the multiple printing media is desired tag information. That is, the image forming apparatus 1 enables the user to confirm multiple sets of tag information written to the wireless tags on the multiple printing media at the same time and thereby makes it possible to more reliably reduce the time and effort required for the user to confirm tag information written to wireless tags.

In ACT 230, the control unit 110 may be configured to display sets of tag information read in ACT 220 on a display unit (or a display) of a separate information processing apparatus instead of or in addition to the display unit of the control panel 12. The information processing apparatus is connected for communication to the image forming apparatus 1. Examples of information processing apparatuses include a multifunctional cellular phone terminal (or a smartphone), a cellular phone terminal, a notebook personal computer (PC), a tablet PC, a desktop PC, and a personal digital assistant (PDA). The information processing apparatus may be owned by, for example, a user of the image forming apparatus 1, another person, or another company. In ACT 230, the control unit 110 may be configured to display sets of tag information read in ACT 220 on an external display device attached to the image forming apparatus 1.

The image G may further include a GUI for receiving an operation to rewrite tag information. The rewriting of tag information is performed by the image forming apparatus 1 in response to the operation when the number of printing media placed in the second area RB is one or when the same tag information is written to all wireless tags on multiple printing media placed in the second area RB. This is because, when multiple printing media are placed in the second area RB, a radio wave cannot be directed only to a desired printing medium among the multiple printing media. When the operation is received, the control unit 110 controls the antenna 131 to write tag information specified by the operation to a wireless tag on a printing medium placed in the second area RB. In this case, the control unit 110 controls the antenna 131 to also perform a verification process. Thus, even when tag information written to a wireless tag is not desired tag information, the user of the image forming apparatus 1 can easily overwrite the tag information in the wireless tag with the desired tag information by operating the image forming apparatus 1. That is, the user can easily rewrite tag information in the wireless tag. The desired tag information may be specified by using, for example, software keys displayed on the display unit of the control panel 12 or hardware keys included in the control panel 12.

After ACT 230 is performed, the control unit 110 waits until an operation is received via a display image displayed in ACT 230 (ACT 240).

When it is determined that the operation has been received via the display image (ACT 240: YES), the control unit 110 determines whether the operation received via the display image is for terminating the display of the display image (ACT 250). In FIG. 9, ACT 250 is indicated by "END DISPLAY?". For example, when the button BD is selected on the image G, the control unit 110 determines, in ACT 250, that the operation received via the display image is for terminating the display of the display image. On the other hand, for example, when a GUI other than the button BD is selected on the image G, the control unit 110 determines, in ACT 250, that the operation received via the display image is not for terminating the display of the display image.

When determining that the operation received via the display image is for terminating the display of the display image (ACT 250: YES), the control unit 110 terminates the display of the display image on the display unit of the control panel 12 and then terminates the process of the flowchart shown in FIG. 9.

On the other hand, when determining that the operation received via the display image is not for terminating the display of the display image (ACT 250: NO), the control unit 110 performs a process corresponding to the operation received via the display image (ACT 260). For example, when the operation received via the display image is for rewriting tag information, the control unit 110 rewrites the tag information in the wireless tag on the printing medium placed in the second area RB in accordance with the operation received via the display image.

After ACT 260 is performed, the control unit 110 returns to ACT 240 and waits until an operation is received via the display image.

As described above, the image forming apparatus 1 controls the antenna 131 in accordance with the read start operation, which is received while the printing medium is placed on the manual feed tray TA and the conveyance of the printing medium is not being performed by the conveyance unit H, to read the tag information from the wireless tag on the printing medium located in the second area RB. With this configuration, the image forming apparatus 1 can reduce the time and effort required for the user to confirm tag information written to a wireless tag.

(Process of Writing Tag Information to Wireless Tag in Second Area)

Figure 11:
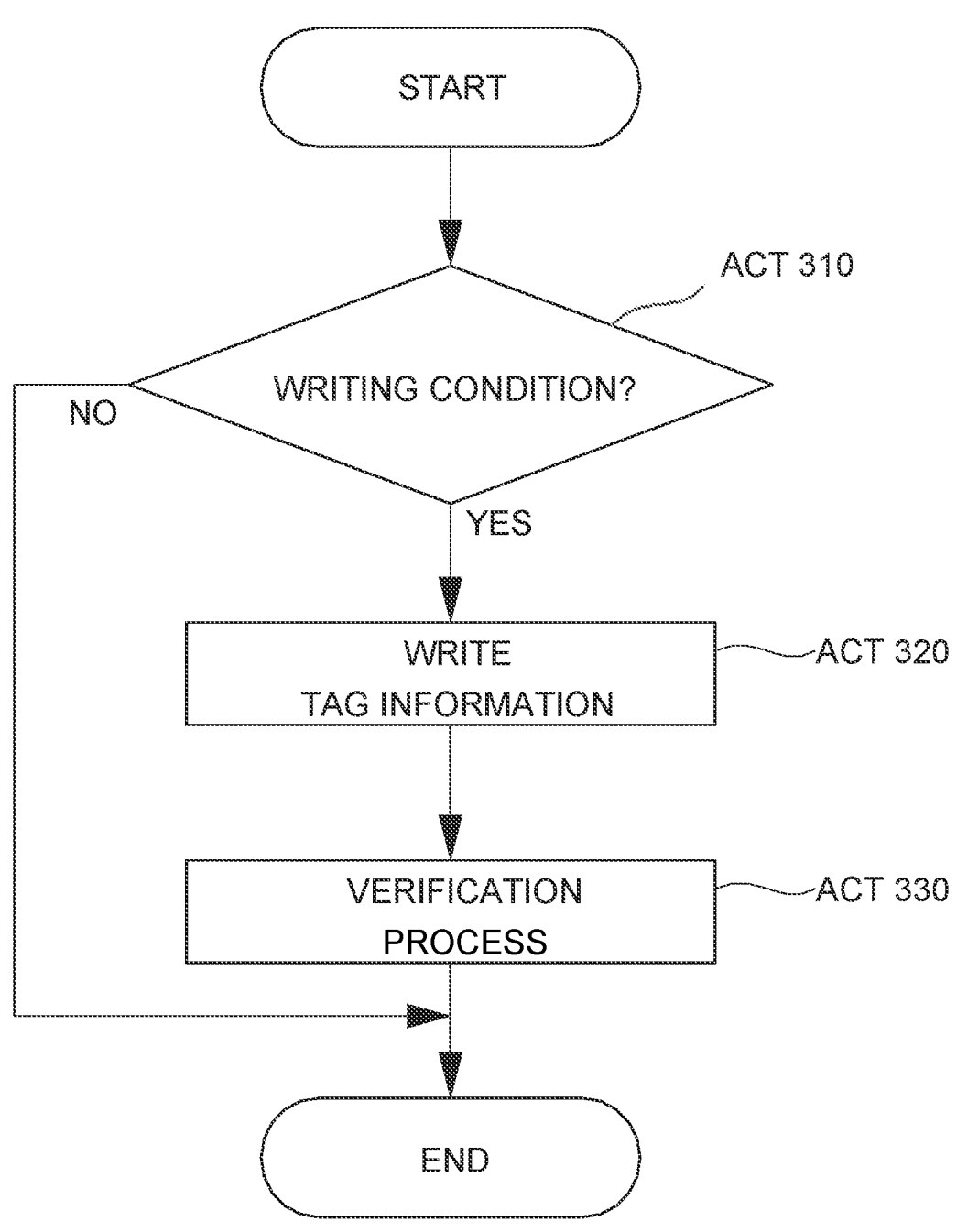
FIG. 11 is a flowchart illustrating a process of writing tag information to a wireless tag in the second area RB.

Referring to FIG. 11, a process of writing tag information to a wireless tag in the second area RB will be described. FIG. 11 is a flowchart illustrating a process of writing tag information to a wireless tag in the second area RB. For example, the control unit 110 performs the process of the flowchart shown in FIG. 11 when an operation for rewriting tag information in a wireless tag on a printing medium placed in the second area RB is received via a display image displayed on the display unit of the control panel 12 or via another method. For convenience of explanation, this operation will be referred to as a write start operation. In the present embodiment, it is assumed that the image forming apparatus 1 receives the write start operation before ACT 310 illustrated in FIG. 11 is performed. Also, it is assumed that one printing medium is placed in the second area RB and the printing medium has a wireless tag. Tag information may have been written to the wireless tag or may have been not written to the wireless tag. In the present embodiment, it is assumed that tag information to be written to the wireless tag is specified by the write start operation before ACT 310 is performed.

After receiving the write start operation, the control unit 110 determines whether a predetermined writing condition is satisfied (ACT 310). When satisfied, the writing condition prevents tag information from being written to a wireless tag on a printing medium that is located in an area on the conveyance path other than the second area RB. For example, the writing condition requires that the write start operation is received while a printing medium is placed on the manual feed tray TA and the conveyance of the printing medium is not being performed by the conveyance unit H. The writing condition may also indicate requirements other than those described above as long as the writing condition prevents tag information from being written to a wireless tag on a printing medium that is located in an area on the conveyance path other than the second area RB.

When it is determined that the writing condition is not satisfied (ACT 310: NO), the control unit 110 causes the display unit of the control panel 12 to display, for example, information indicating that the writing condition is not satisfied and then ends the process of the flowchart shown in FIG. 11. The user of the image forming apparatus 1 can perform the write start operation again after the writing condition is satisfied.

On the other hand, when it is determined that the writing condition is satisfied (ACT 310: YES), the control unit 110 controls the antenna 131 to write tag information specified by the received write start operation to the wireless tag on the printing medium placed in the second area RB (ACT 320). In ACT 320, the control unit 110 may be configured to change the polarization direction of the radio wave radiated from the antenna 131 to a polarization direction suitable for writing the tag information to the wireless tag in the second area RB or may be configured to not change a predetermined polarization direction. In ACT 320, the control unit 110 may be configured to sequentially change the polarization direction of the radio wave radiated from the antenna 131 to each of multiple predetermined polarization directions. Also, the control unit 110 may be configured to change the polarization direction in accordance with a received operation or as a predetermined automatic process. For example, in ACT 320, the control unit 110 sequentially changes the polarization direction of the radio wave radiated from the antenna 131 to each of multiple predetermined polarization directions. In ACT 320, the control unit 110 may be configured to change the intensity of the radio wave radiated from the antenna 131 to an intensity suitable for writing the tag information to the wireless tag in the second area RB or may be configured to not change a predetermined intensity. The control unit 110 may be configured to change the intensity in accordance with a received operation or as a predetermined automatic process. In the present embodiment, it is assumed that the control unit 110 changes the intensity of the radio wave radiated from the antenna 131 to an intensity corresponding to an operation received in advance. For example, the intensity corresponding to the operation is greater than the intensity of the radio wave that the antenna 131 is caused to radiate by the control unit 110 in the process of the flowchart shown in FIG. 8. With this configuration, the control unit 110 can reduce the risk of failure in writing the tag information to the wireless tag in the second area RB.

Next, the control unit 110 performs a verification process of determining whether the writing of the tag information to the wireless tag in ACT 320 has been completed successfully (ACT 330).

After ACT 330 is performed, the control unit 110 ends the process of the flowchart shown in FIG. 11.

As described above, when a printing medium is placed on the manual feed tray TA and the conveyance of the printing medium by the conveyance unit H is not being performed, the image forming apparatus 1 controls the antenna 131 in accordance with a received write start operation to write tag information to a wireless tag located in the second area RB. Accordingly, the image forming apparatus 1 can write tag information to and overwrite tag information in a wireless tag on a printing medium without conveying the printing medium to the first area RA with the conveyance unit H. For example, this enables the user of the image forming apparatus 1 to write tag information to a wireless tag and rewrite the tag information written to the wireless tag without forming an image on the printing medium. That is, the image forming apparatus 1 can reduce the time and effort required for the user to rewrite tag information after the tag information is written to a wireless tag and confirmed.

(Cooperation Between Image Forming Apparatus and Information Processing Apparatus)

Figure 12:
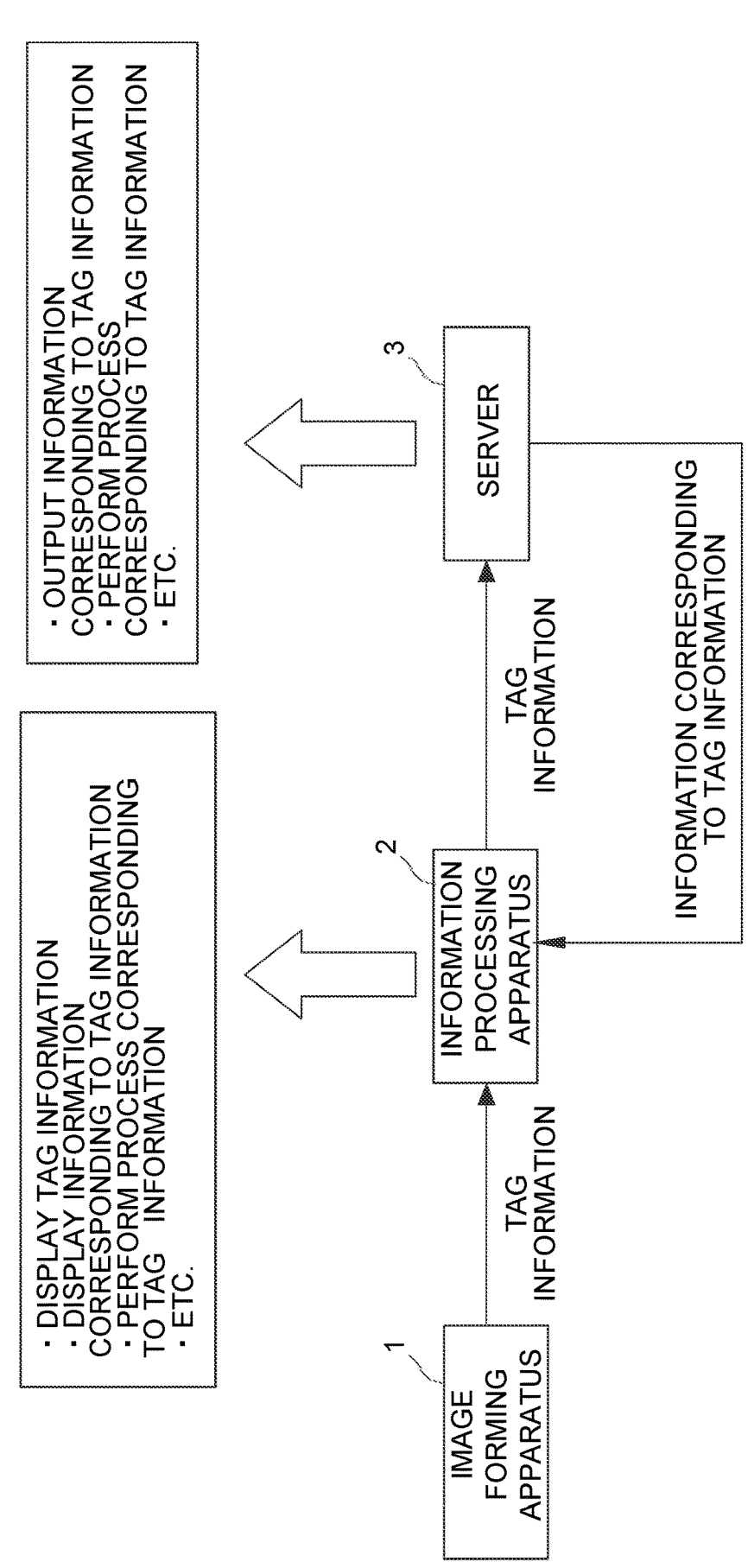
FIG. 12 is a diagram illustrating a process performed by the image forming apparatus in cooperation with an information processing apparatus.

Next, cooperation between the image forming apparatus 1 and an information processing apparatus will be described with reference to FIG. 12. FIG. 12 is a diagram for explaining cooperation between the image forming apparatus 1 and an information processing apparatus.

For example, the image forming apparatus 1 may be configured to output the tag information read in ACT 220 illustrated in FIG. 9 to an information processing apparatus and cause the information processing apparatus to perform a process corresponding to the output tag information. In the example illustrated in FIG. 12, the image forming apparatus 1 is connected for communication to an information processing apparatus 2.

The information processing apparatus 2 is, for example, but not limited to, a notebook PC or a desktop PC that outputs a print job to the image forming apparatus 1 in response to an operation received from a user. The information processing apparatus 2 causes a display unit of the information processing apparatus 2 to display tag information output from the image forming apparatus 1. For example, the information processing apparatus 2 causes the display unit to display an image that is the same as the image G illustrated in FIG. 10. For example, when the tag information displayed on the display unit indicates a uniform resource locator (URL) of a certain website, the information processing apparatus 2 causes the display unit to display the website in accordance with a received operation. For example, when one of multiple sets of tag information displayed on the display unit indicates a uniform resource locator (URL) of image data, the information processing apparatus 2 causes the display unit to display the image data in accordance with a received operation. Displaying the website or the image data is an example of "DISPLAY INFORMATION CORRESPONDING TO TAG INFORMATION" shown in FIG. 12. For example, when one of multiple sets of tag information displayed on the display unit indicates a code that causes the information processing apparatus 2 to perform a certain process, the information processing apparatus 2 performs the process corresponding to the code in accordance with a received operation. Examples of processes include, but are not limited to, outputting a predetermined sound from a speaker and downloading predetermined information. These processes are examples of "PERFORM PROCESS CORRESPONDING TO TAG INFORMATION" shown in FIG. 12.

The information processing apparatus 2 may also be connected for communication to a server 3 as illustrated in FIG. 12.

The server 3 provides various services on the Internet. For example, when tag information is acquired from the information processing apparatus 2, the server 3 performs a process corresponding to the acquired tag information. For example, the server 3 may store relevant information in association with each of multiple sets of tag information. In this case, when tag information is acquired from the information processing apparatus 2, the server 3 identifies relevant information associated with the acquired tag information, and outputs the identified relevant information to the information processing apparatus 2. With this configuration, the user of the image forming apparatus 1 can confirm relevant information associated with tag information with the information processing apparatus 2 by causing the image forming apparatus 1 to output the tag information to the information processing apparatus 2. The relevant information is, for example, but not limited to, product information, a product image, a store profile, or sales promotion information. For example, the server 3 may store a relevant process in association with each of multiple sets of tag information. In this case, when tag information is acquired from the information processing apparatus 2, the server 3 identifies a relevant process associated with the acquired tag information and performs the identified relevant process. The relevant process is, for example, but not limited to, ordering a product or applying to a campaign. Thus, the user of the image forming apparatus 1 can cause the server 3 to perform a relevant process associated with tag information by causing the image forming apparatus 1 to output the tag information to the information processing apparatus 2.

As described above, the image forming apparatus 1 may be configured to cooperate with an information processing apparatus. The image forming apparatus 1 may also be configured to be connected for communication to the server 3. In this case, the image forming apparatus 1 can display relevant information associated with tag information and perform a relevant process associated with tag information without using the information processing apparatus 2.

(Making Settings of Wireless Tag Communication Device by Image Forming Apparatus)

The image forming apparatus 1 described above may be configured to make various settings of the wireless tag communication devise 13 in accordance with operations received via the control panel 12 before the processes of the flowcharts illustrated in FIGS. 8, 9, and 11 are performed. The various settings include, but are not limited to, a radiation direction, an intensity, and a polarization direction of a radio wave radiated from the antenna 131 and a Q value of a resonance circuit connected to the antenna 131. When the image forming apparatus 1 is configured to make these settings of the wireless tag communication device 13 in accordance with received operations, the image forming apparatus 1 can cause the antenna 131 to radiate radio waves suitable for the writing of tag information to a wireless tag in the first area RA, the reading of tag information from a wireless tag in the second area RB, and the writing of tag information to a wireless tag in the second area RB. With this configuration, the image forming apparatus 1 can reduce the risk of failure in writing tag information to a wireless tag and reading tag information from a wireless tag.

As described above, the image forming apparatus 1 includes the manual feed tray TA, the conveyance unit H, the image forming unit 113, and the control unit 110. A printing medium to which a wireless tag is attached is placed on the manual feed tray TA. The conveyance unit H conveys the printing medium placed on the manual feed tray TA. The image forming unit 113 forms an image on the printing medium. The control unit 110 controls the conveyance unit H, the image-forming unit 113, and the antenna 131 that radiates a radio wave to each of the first area RA that is on the conveyance path along which the printing medium is conveyed by the conveyance unit H and located downstream of the manual feed tray TA and the second area RB in an area where the printing medium is placed on the manual feed tray TA. The control unit 110 controls the antenna 131 in accordance with an operation that is received while the printing medium is placed on the manual feed tray TA and the conveyance of the printing medium is not being performed by the conveyance unit H to read tag information from the wireless tag located in the second area RB. With this configuration, the image forming apparatus 1 can reduce the time and effort required for the user to confirm tag information written to a wireless tag.

The features and configurations described above may be combined in any appropriate way.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

Programs for implementing functions of components of apparatuses (for example, the image forming apparatus 1) described above may be recorded in a non-transitory computer-readable storage medium, and the programs may be read and executed by a computer system or a processor. Here, the "computer system" may include an operating system (OS) and hardware such as peripheral devices. The "non-transitory computer-readable storage medium" indicates, for example, a portable medium, such as a flexible disk, a magneto-optical disk, a ROM, or a compact disk (CD)-ROM, or a storage device, such as a hard disk included in the computer system. The "non-transitory computer-readable storage medium" may also indicate a medium that temporarily stores programs, such as a volatile memory (RAM) included in a computer system that serves as a server or a client when the programs are transmitted via a network such as the Internet or a communication line such as a telephone line.

The programs may be transmitted from a computer system, in which the programs are stored in a storage device or the like, to another computer system via a transmission medium or a transmission wave in the transmission medium. The "transmission medium" for transmitting the programs indicates, for example, a network (or a communication network), such as the Internet, or a communication line, such as a telephone line, that has a function to transmit information.

The programs may implement parts of the above-described functions. The programs may be difference files (or difference programs) that implement the above-described functions in combination with programs already stored in a computer system.

What is claimed is:

1. An image forming apparatus, comprising:
a housing;
a manual feed tray on which a printing medium with a wireless tag is placeable, the manual feed tray including a first portion that is located inside the housing and a second portion that is located outside the housing;
a conveyance mechanism disposed in the housing and configured to convey the printing medium;
an image forming unit disposed in the housing and configured to form an image on the printing medium;
a wireless tag communication device including an antenna, disposed in the housing above the first portion of the manual feed tray, and configured to communicate with the wireless tag by radiating, via the antenna, a radio wave to each of:
a first area that is on a conveyance path along which the printing medium is conveyed by the conveyance mechanism and located downstream of the manual feed tray and
a second area that is on the manual feed tray at a location corresponding to the first portion of the manual feed tray; and
a processor configured to, in response to an operation for printing an image on a printing medium and writing data into a wireless tag attached to the printing medium:
control the conveyance mechanism to convey the printing medium and control the wireless tag communication device to radiate a first radio wave to write the data into the wireless tag attached to the printing medium, and

22 control the image forming unit to form the image on the printing medium, wherein
the processor is configured to, in response to an operation for reading data from a wireless tag attached to a printing medium placed on the manual feed tray,
determine whether a reading condition is satisfied, the reading condition requiring that the operation for reading data is received while the printing medium is placed on the manual feed tray and conveyance of the printing medium by the conveyance mechanism is not being performed,
upon determining that the reading condition is satisfied, control the wireless tag communication device to radiate a second radio wave to read the data from the wireless tag without conveying the printing medium by the conveyance mechanism, and
upon determining that the reading condition is not satisfied, output information indicating that the reading condition is not satisfied.

2. The image forming apparatus according to claim 1, wherein
the second area intersects a radiation plane of the radio wave from the antenna, and overlaps the antenna when viewed in the direction of gravity.

3. The image forming apparatus according to claim 1, wherein
an intensity of the second radio wave is greater than an intensity of the first radio wave.

4. The image forming apparatus according to claim 1, wherein
the conveyance mechanism includes a registration roller,
the printing medium contacts the registration roller when the wireless tag is in the first area, and
the printing medium does not contact the registration roller when the wireless tag is in the second area.

5. The image forming apparatus according to claim 1, further comprising:
a display, wherein
the processor is configured to cause the display to display the data read from the wireless tag.

6. The image forming apparatus according to claim 1, wherein
the processor is configured to cause a display of an information processing apparatus connected for communication to the image forming apparatus to display the data read from the wireless tag.

7. The image forming apparatus according to claim 1, further comprising:
a sheet discharge tray, wherein
the processor is configured to control the conveyance mechanism to discharge, to the sheet discharge tray, the printing medium in which the data has been written into the wireless tag and on which the image has been formed.

8. The image forming apparatus according to claim 1, wherein
the processor is configured to cause the data read from the wireless tag to be output to an information processing apparatus that is connected for communication to the image forming apparatus.

9. The image forming apparatus according to claim 1, wherein
the processor is configured to perform a verification process to determine whether the data has been successfully written to the wireless tag in the first area.

10. The image forming apparatus according to claim 1, wherein

23 the antenna extends along a side surface of the housing, and one end of the second area is closer to a lower end of the antenna than an opposite end of the second area, and one end of the first area is closer to the lower end of the antenna than an opposite end of the first area, the lower end of the antenna being closer to said one end of the second area than to said one end of the first area.

11. The image forming apparatus according to claim 1, wherein the processor is further configured to, in response to an operation for writing data into a wireless tag attached to a printing medium placed on the manual feed tray:

determine whether a writing condition is satisfied, the writing condition requiring that the operation for writing data is received while the printing medium is placed on the manual feed tray and conveyance of the printing medium by the conveyance mechanism is not being performed, upon determining that the writing condition is satisfied, control the wireless tag communication device to radiate a third radio wave to write the data into the wireless tag without conveying the printing medium by the conveyance mechanism, and upon determining that the writing condition is not satisfied, output information indicating that the writing condition is not satisfied.

12. A method performed by an image forming apparatus that includes:

a housing, a manual feed tray on which a printing medium with a wireless tag is placeable, the manual feed tray including a first portion that is located inside the housing and a second portion that is located outside the housing, a conveyance mechanism disposed in the housing and configured to convey the printing medium, an image forming unit disposed in the housing and configured to form an image on the printing medium, and a wireless tag communication device including an antenna, disposed in the housing above the first portion of the manual feed tray, and configured to communicate with the wireless tag by radiating, via the antenna, a radio wave to each of:

a first area that is on a conveyance path along which the printing medium is conveyed by the conveyance mechanism and located downstream of the manual feed tray and a second area that is on the manual feed tray at a location corresponding to the first portion of the manual feed tray, the method comprising:

in response to an operation for printing an image on a printing medium and writing data into a wireless tag attached to the printing medium:

controlling the conveyance mechanism to convey the printing medium and controlling the wireless tag communication device to radiate a first radio wave to write the data into the wireless tag attached to the printing medium, and controlling the image forming unit to form the image on the printing medium; and in response to an operation for reading the data from the wireless tag attached to the printing medium placed on the manual feed tray, determining whether a reading condition is satisfied, the reading condition requiring that the operation for reading data is received while the printing medium is placed on the manual feed tray and conveyance of the printing medium by the conveyance mechanism is not being performed, upon determining that the reading condition is satisfied, controlling the wireless tag communication device to radiate a second radio wave to read the data from the wireless tag without conveying the printing medium by the conveyance mechanism, and upon determining that the reading condition is not satisfied, outputting information indicating that the reading condition is not satisfied.

13. The method according to claim 12, wherein an intensity of the second radio wave is greater than an intensity of the first radio wave.

14. The method according to claim 12, further comprising:

causing a display of the image forming apparatus to display the data read from the wireless tag.

15. The method according to claim 12, further comprising:

causing a display of an information processing apparatus connected for communication to the image forming apparatus to display the data read from the wireless tag.

16. The method according to claim 12, further comprising:

controlling the conveyance mechanism to discharge, to a sheet discharge tray, the printing medium in which the data has been written into the wireless tag and on which the image has been formed.

17. The method according to claim 12, further comprising:

outputting the data read from the wireless tag to an information processing apparatus that is connected for communication to the image forming apparatus.

18. The method according to claim 12, further comprising:

performing a verification process to determine whether the data has been successfully written to the wireless tag in the first area.

19. The method according to claim 12, further comprising:

in response to an operation for writing data into a wireless tag attached to a printing medium placed on the manual feed tray:

determining whether a writing condition is satisfied, the writing condition requiring that the operation for writing data is received while the printing medium is placed on the manual feed tray and conveyance of the printing medium by the conveyance mechanism is not being performed, upon determining that the writing condition is satisfied, controlling the wireless tag communication device to radiate a third radio wave to write the data into the wireless tag without conveying the printing medium by the conveyance mechanism, and upon determining that the writing condition is not satisfied, outputting information indicating that the writing condition is not satisfied.

20. A non-transitory computer-readable storage medium storing a program for causing a processor of an image forming apparatus to perform a process, the image forming apparatus that includes:

a housing, a manual feed tray on which a printing medium with a wireless tag is placeable, the manual feed tray including a first portion that is located inside the housing and a second portion that is located outside the housing, a conveyance mechanism disposed in the housing and configured to convey the printing medium, an image forming unit disposed in the housing and configured to form an image on the printing medium, and a wireless tag communication device including an antenna, disposed in the housing above the first portion of the manual feed tray, and configured to communicate with the wireless tag by radiating, via the antenna, a radio wave to each of:

a first area that is on a conveyance path along which the printing medium is conveyed by the conveyance mechanism and located downstream of the manual feed tray and a second area that is on the manual feed tray at a location corresponding to the first portion of the manual feed tray, the process including:

in response to an operation for printing an image on a printing medium and writing data into a wireless tag attached to the printing medium:

controlling the conveyance mechanism to convey the printing medium and controlling the wireless tag communication device to radiate a first radio wave to write the data into the wireless tag attached to the printing medium, and controlling the image forming unit to form the image on the printing medium; and in response to an operation for reading the data from the wireless tag attached to the printing medium placed on the manual feed tray, determining whether a reading condition is satisfied, the reading condition requiring that the operation for reading data is received while the printing medium is placed on the manual feed tray and conveyance of the printing medium by the conveyance mechanism is not being performed, upon determining that the reading condition is satisfied, controlling the wireless tag communication device to radiate a second radio wave to read the data from the wireless tag without conveying the printing medium by the conveyance mechanism, and upon determining that the reading condition is not satisfied, outputting information indicating that the reading condition is not satisfied.

21. The computer-readable storage medium according to claim 20, wherein an intensity of the second radio wave is greater than an intensity of the first radio wave.

22. The computer-readable storage medium according to claim 20, wherein the process further comprises:

causing a display of the image forming apparatus to display the data read from the wireless tag.

23. The computer-readable storage medium according to claim 20, wherein the process further comprises:

in response to an operation for writing data into a wireless tag attached to a printing medium placed on the manual feed tray:

determining whether a writing condition is satisfied, the writing condition requiring that the operation for writing data is received while the printing medium is placed on the manual feed tray and conveyance of the printing medium by the conveyance mechanism is not being performed, upon determining that the writing condition is satisfied, controlling the wireless tag communication device to radiate a third radio wave to write the data into the wireless tag without conveying the printing medium by the conveyance mechanism, and upon determining that the writing condition is not satisfied, outputting information indicating that the writing condition is not satisfied.

\* \* \* \* \*